United States Patent
Zhang et al.

(10) Patent No.: US 11,048,001 B2
(45) Date of Patent: Jun. 29, 2021

(54) METHODS USING TRAVEL-TIME FULL WAVEFORM INVERSION FOR IMAGING SUBSURFACE FORMATIONS WITH SALT BODIES

(71) Applicant: CGG SERVICES SAS, Massy (FR)

(72) Inventors: Zhigang Zhang, Houston, TX (US); Ping Wang, Katy, TX (US); Adriano Gomes, Houston, TX (US); Jiawei Mei, Katy, TX (US); Feng Lin, Katy, TX (US); Rongxin Huang, Katy, TX (US)

(73) Assignee: CGG SERVICES SAS, Massy (FR)

( * ) Notice: Subject to any disclaimer, the term of this patent is extended or adjusted under 35 U.S.C. 154(b) by 371 days.

(21) Appl. No.: 16/049,941

(22) Filed: Jul. 31, 2018

(65) Prior Publication Data
US 2019/0302293 A1    Oct. 3, 2019

Related U.S. Application Data

(60) Provisional application No. 62/650,689, filed on Mar. 30, 2018, provisional application No. 62/650,544, filed on Mar. 30, 2018, provisional application No. 62/650,496, filed on Mar. 30, 2018.

(51) Int. Cl.
*G01V 1/30* (2006.01)
*G01V 1/28* (2006.01)

(52) U.S. Cl.
CPC .............. *G01V 1/303* (2013.01); *G01V 1/282* (2013.01); *G01V 2210/614* (2013.01); *G01V 2210/679* (2013.01)

(58) Field of Classification Search
CPC ....................................................... G01V 1/303
USPC ............................................................ 702/18
See application file for complete search history.

(56) References Cited

U.S. PATENT DOCUMENTS

| | | | |
|---|---|---|---|
| 8,223,587 | B2 | 7/2012 | Krebs et al. |
| 9,075,159 | B2 | 7/2015 | Washbourne et al. |
| 9,864,083 | B2 | 1/2018 | Hu |
| 2012/0316790 | A1 | 12/2012 | Washbourne et al. |

(Continued)

FOREIGN PATENT DOCUMENTS

| | | |
|---|---|---|
| WO | 2013093467 A1 | 6/2013 |
| WO | 2015124960 A1 | 8/2015 |

OTHER PUBLICATIONS

Lailly, P., "The seismic inverse problem as a sequence of before stack migrations" in Conference on inverse scattering; Theory and application, SIAM; Jan. 1983; pp. 206-220.

(Continued)

*Primary Examiner* — Ricky Go
(74) *Attorney, Agent, or Firm* — Patent Portfolio Builders PLLC

(57) ABSTRACT

Methods and devices use improved FWI techniques for seismic exploration of subsurface formations including salt bodies using a travel-time cost function. In calculating the travel-time cost function, time-shifts may be weighted using cross-correlation coefficients of respective time-shifted recorded data and synthetic data generated based on current velocity model. The improved methods enhance the resulting image while avoiding cycle-skipping and issues related to amplitude difference between synthetic and recorded data.

20 Claims, 31 Drawing Sheets

(56) References Cited

U.S. PATENT DOCUMENTS

| | | | |
|---|---|---|---|
| 2012/0316791 A1 | 12/2012 | Shah et al. | |
| 2012/0316844 A1 | 12/2012 | Shah et al. | |
| 2013/0238249 A1 | 9/2013 | Xu et al. | |
| 2016/0097870 A1* | 4/2016 | Routh | G01V 1/003 703/2 |
| 2016/0282490 A1* | 9/2016 | Qin | G01V 1/282 |
| 2016/0291177 A1* | 10/2016 | Albertin | G01V 1/303 |
| 2016/0320505 A1* | 11/2016 | D'Afonseca | G01V 1/303 |
| 2017/0131418 A1* | 5/2017 | Wang | G01V 1/282 |
| 2017/0242142 A1 | 8/2017 | Jiao et al. | |
| 2017/0248715 A1* | 8/2017 | Seher | G01V 1/308 |
| 2018/0120464 A1 | 5/2018 | Sun et al. | |
| 2018/0335530 A1* | 11/2018 | Wu | G01V 1/362 |
| 2019/0187312 A1* | 6/2019 | Ramox-Martinez | G01V 1/201 |
| 2020/0003920 A1* | 1/2020 | Tang | G01V 1/282 |
| 2020/0088895 A1* | 3/2020 | Pattnaik | G01V 1/284 |

OTHER PUBLICATIONS

Alkalifah, T., et al.; "The natural combination of full and image-based waveform inversion"; Geophysical Prospecting, 64; Jun. 2015; pp. 19-30.

Baysal, E., et al.; "Reverse time migration"; Geophysics, vol. 48, No. 11; Nov. 1983; pp. 1514-1524.

Chavent, G., et al.; "Automatic determination of velocities via migration-based traveltime waveform inversion: A synthetic data example"; 64th Annual International Meeting, SEG, Expanded Abstracts; 1994; pp. 1179-1182. [downloaded Oct. 3, 2018 at https://library.seg.org/doi/abs/10.1190/1.1822731].

Chi, B., et al.; "Correlation-based reflection full-waveform inversion"; Geophysics, 80(4): Jul.-Aug. 2015; pp. R189-R202.

Choi, Y., et al.; "Application of encoded multi-source waveform inversion to marine-streamer acquisition based on the global correlation"; 73rd EAGE Conference, Extended Abstracts,; Jun. 2011; p. F026.

Clement, F.G., et al.; "Migration-based traveltime waveform inversion of 2-D simple structures: A synthetic example"; Geophysics, 66(3); May-Jun. 2001; pp. 845-860.

Dellinger, J., et al.; "Wolfspar®, an "FWI-friendly" ultralow-frequency marine seismic source"; 86th Annual International Meeting, SEG, Expanded Abstracts; Oct. 17, 2016; pp. 4891-4895 [https://doi.org/10.1190/segam2016-13762702.1.].

Gomes, A., et al.; "Extending the reach of full-waveform inversion with reflection data: Potential and challenges"; 87th Annual International Meeting, SEG, Expanded Abstracts; Sep. 2017; pp. 1454-1459.

Irabor, K., et al.; "Reflection FWI"; 86th Annual International Meeting, SEG, Expanded Abstracts; Oct. 2016; pp. 1136-1140.

Zhou, W., et al. "Velocity model building by waveform inversion of early arrivals and reflections: A 2D case study with gas-cloud effects"; Geophysics, 83(2), Mar.-Apr. 2018; pp. R141-R157.

Luo, Y., et al., "Full-traveltime inversion"; Geophysics, 81(5); Sep.-Oct. 2016; pp. R261-R274.

Luo, Y., et al.; "Wave-equation traveltime inversion"; Geophysics, 56; May 1991; pp. 645-653.

Ma, Y., et al.; "Wave-equation reflection traveltime inversion with dynamic warping and full-waveform inversion"; Geophysics, 78(6); Nov.-Dec. 2013; pp. R223-R233.

Maharromov, M., et al.; "Time-domain broadband phase-only full-waveform inversion with implicit shaping"; 87th Annual International Meeting, SEG, Expanded Abstracts, Sep. 25, 2107; pp. 1136-1140.

Mandroux, F., et al.; "Broadband, long-offset, full-azimuth, staggered marine acquisition in the Gulf of Mexico"; First Break, 31(6); 2013; pp. 125-132.

Michell, S., et al.; "Automatic Velocity Model Building with Complex Salt: Can Computers Finally Do an Interpreter's Job?"; 87th Annual International Meeting, SEG, Expanded Abstracts; Sep. 25, 2017; pp. 5250-5254 [https://doi.org/10.1190/segam2017-17778443.1].

Mora, P., "Inversion = migration +tomography"; Geophysics, 54(12); Dec. 1989; pp. 1575-1586.

Shen, X., et al.; "Full-waveform inversion: The next leap forward in subsalt imaging"; The Leading Edge, 37(1); Jan. 2018; pp. 67b1-67b6, [https://doi.org/10.1190/tle37010067b1.1.].

Shen, X., et al.; "Salt model building at Atlantis with Full Waveform Inversion"; 87th Annual International Meeting, SEG, Expanded Abstracts; Sep. 28, 2017; pp. 1507-1511, [https://doi.org/10.1190/segam2017-17738630.1].

Sirgue, L.,et al.; "Efficient waveform inversion and imaging: A strategy for selecting temporal frequencies"; Geophysics, 69(1); 2004; pp. 231-248.

Sun, D., et al.; "Reflection based waveform inversion"; 86th Annual International meeting, SEG, Expanded Abstracts; Oct. 18, 2016; pp. 1151-1156.

Tarantola, A.; "Inversion of seismic reflection data in the acoustic approximation"; Geophysics, 49(8); Aug. 1984; pp. 1259-1266.

Vigh, D., et al., "Earth-model building from shallow to deep with full-waveform inversion"; The Leading Edge, 35(12); Dec. 2016; pp. 1025-1030.

Wang, et al., "Dynamic warping full-waveform inversion to overcome cycle skipping"; 86th Annual International Meeting, Expanded Abstracts, Oct. 2016; pp. 1273-1277.

Wang, M., et al.; "Least-squares RTM"; Theory and applications, 15th International Congress of the Brazilian Geophysical Society (SBGf); Jul. 31-Aug. 3, 2017; pp. 1215-1229.

Wang, P., et al.; "A demigration-based reflection full waveform inversion workflow"; SEG Technical Program Expanded Abstracts; Oct. 16, 2018; pp. 1138-1142.

Wang, P., et al.; "Least-squares RTM: Reality and possibilities for subsalt imaging"; 86th Annual International Meeting, SEG, Expanded Abstracts; Oct. 18, 2016; pp. 4204-4209.

Wang, P.; "Improved iterative least-squares migration using curvelet-domain Hessian filters"; 87th Annual International Meeting, SEG, Expanded Abstracts; Sep. 27, 2017; pp. 4555-4560.

Warner, M., et al., "Adaptive waveform inversion: Theory"; 84th Annual International Meeting, SEG, Expanded Abstracts, 2014; pp. 1089-1093. [Downloaded Oct. 29, 2018 at https://library.seg.org/doi/pdf/10.1190/segam2014-0371.1].

Xu, S., et al.; "Full waveform inversion for reflected seismic data"; 74th Conference and Exhibition, EAGE, Extended Abstracts; Jun. 4-7, 2012; p. W024.

Zhang, Y., et al.; "Reverse-time migration: amplitude and implementation issues";SEG San Antonio 2007 Annual Meeting, SEG Technical Program Expanded Abstracts; Sep. 24-29, 2007: pp. 2145-2149. [downloaded Jun. 28, 2018 at https://library.seg.org/doi/abs/10.1190/1.2792912].

Zhang, Y., et al.; "Correcting for salt misinterpretation with full-waveform inversion"; SEG Technical Program Expanded Abstracts Oct. 16, 2018: pp. 1143-1147.

Liu, F., et al.; "An effective imaging condition for reverse-time migration using wavefield decomposition"; Geophysics, vol. 76, No. 1, Jan. 2011; 11 pages.

Plessix, R. E., "A review of the adjoint-state method for computing the gradient of a functional with geophysical applications"; Geophysical Journal International, vol. 167, Issue 2, Nov. 2006, pp. 495-503.

* cited by examiner

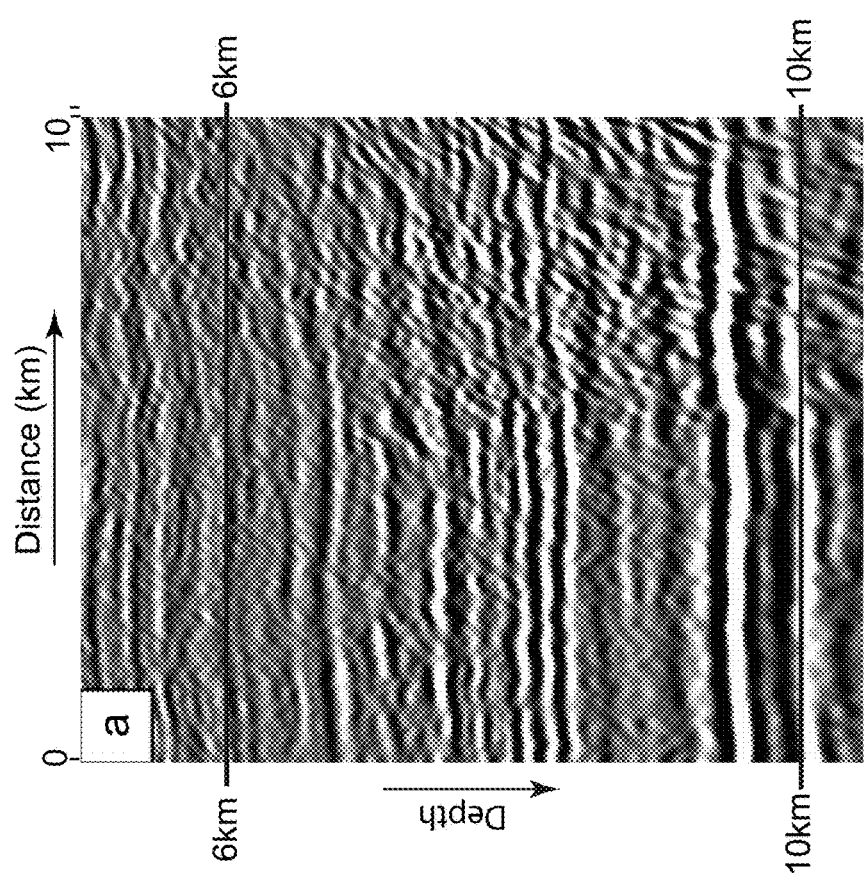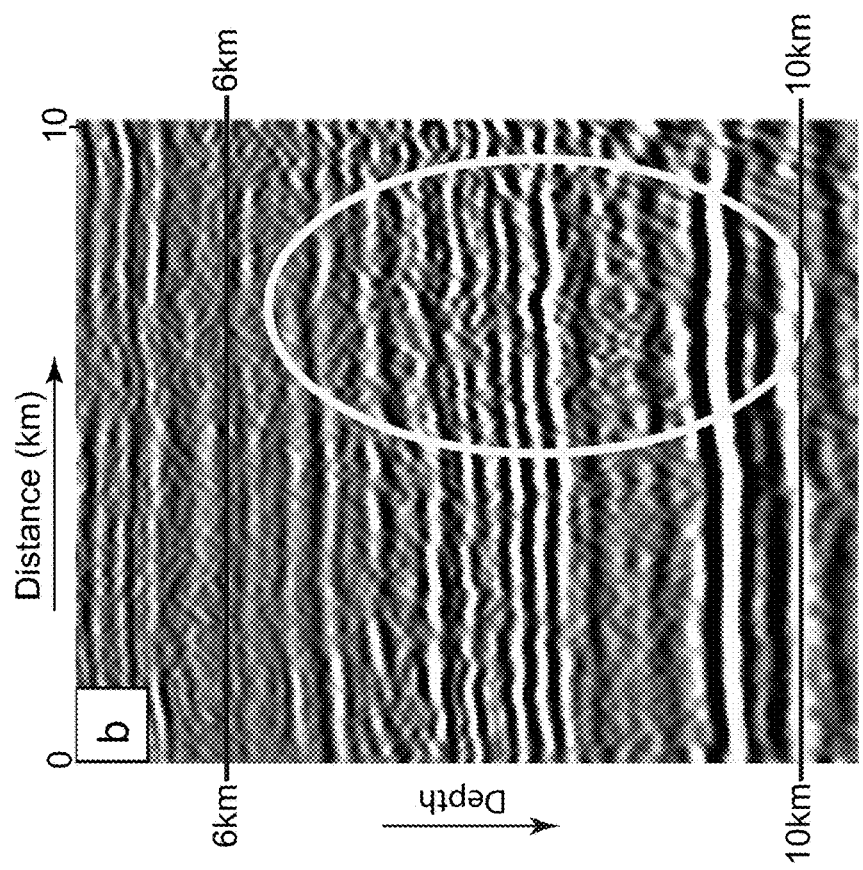

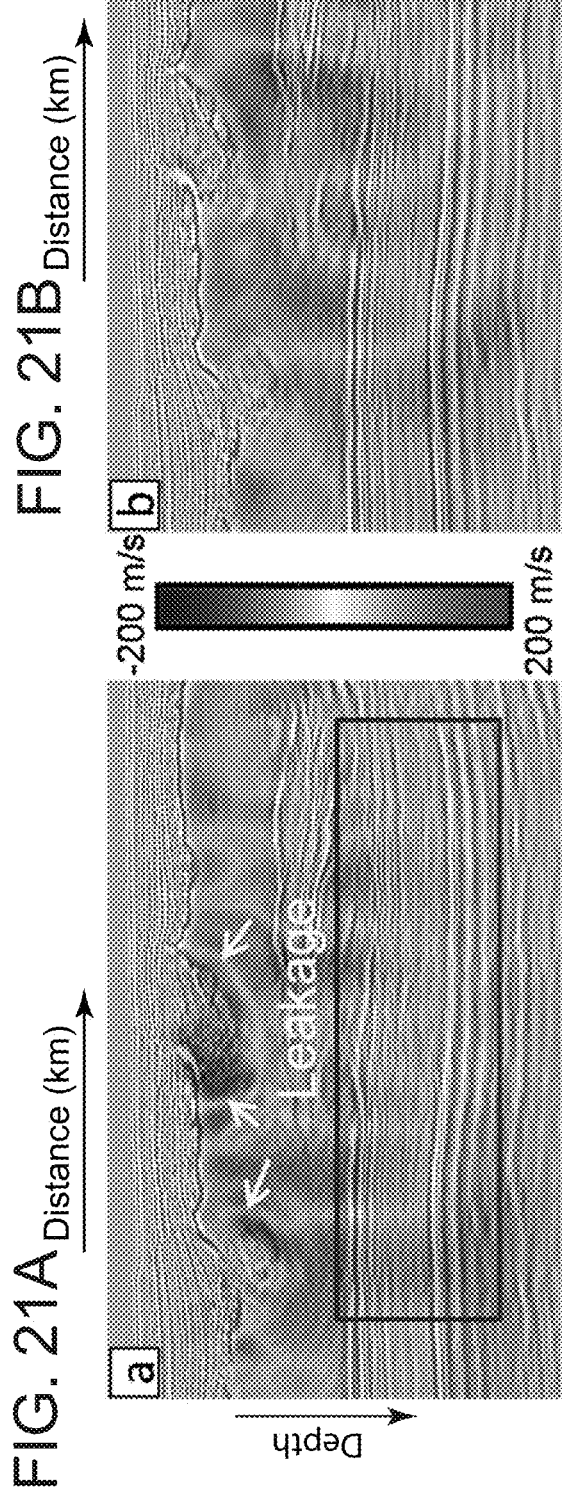
FIG. 21A
FIG. 21B
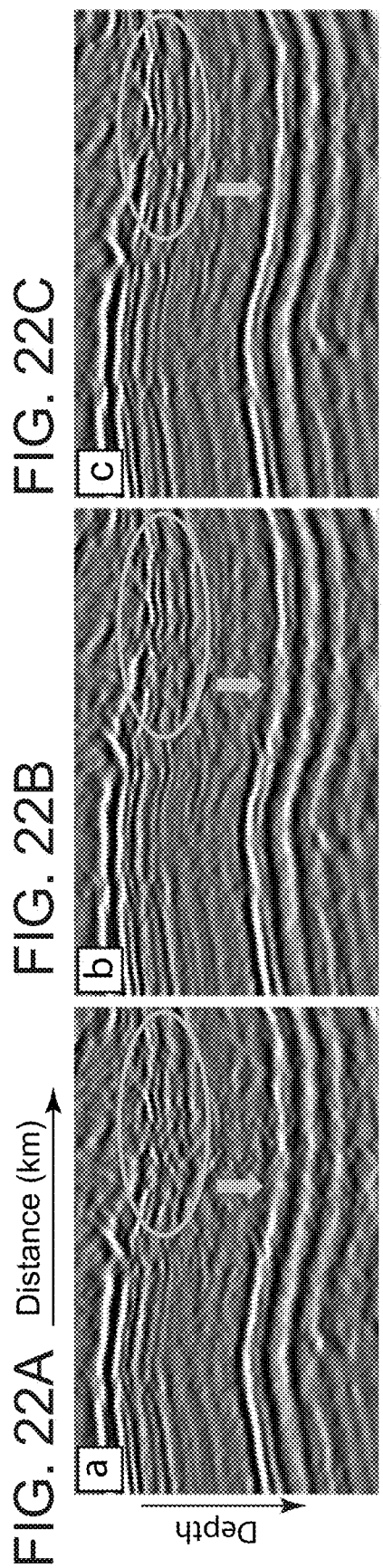
FIG. 22A
FIG. 22B
FIG. 22C

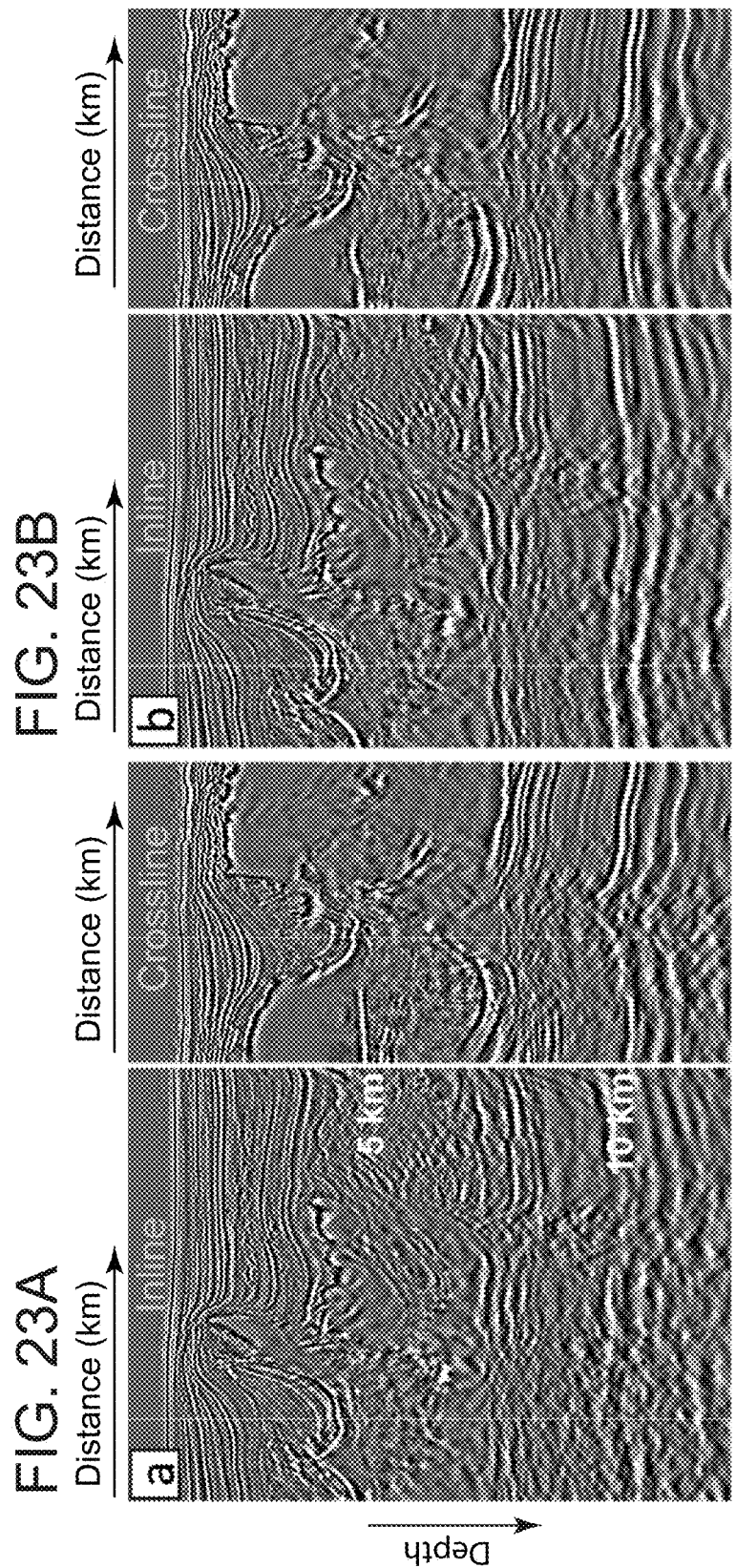

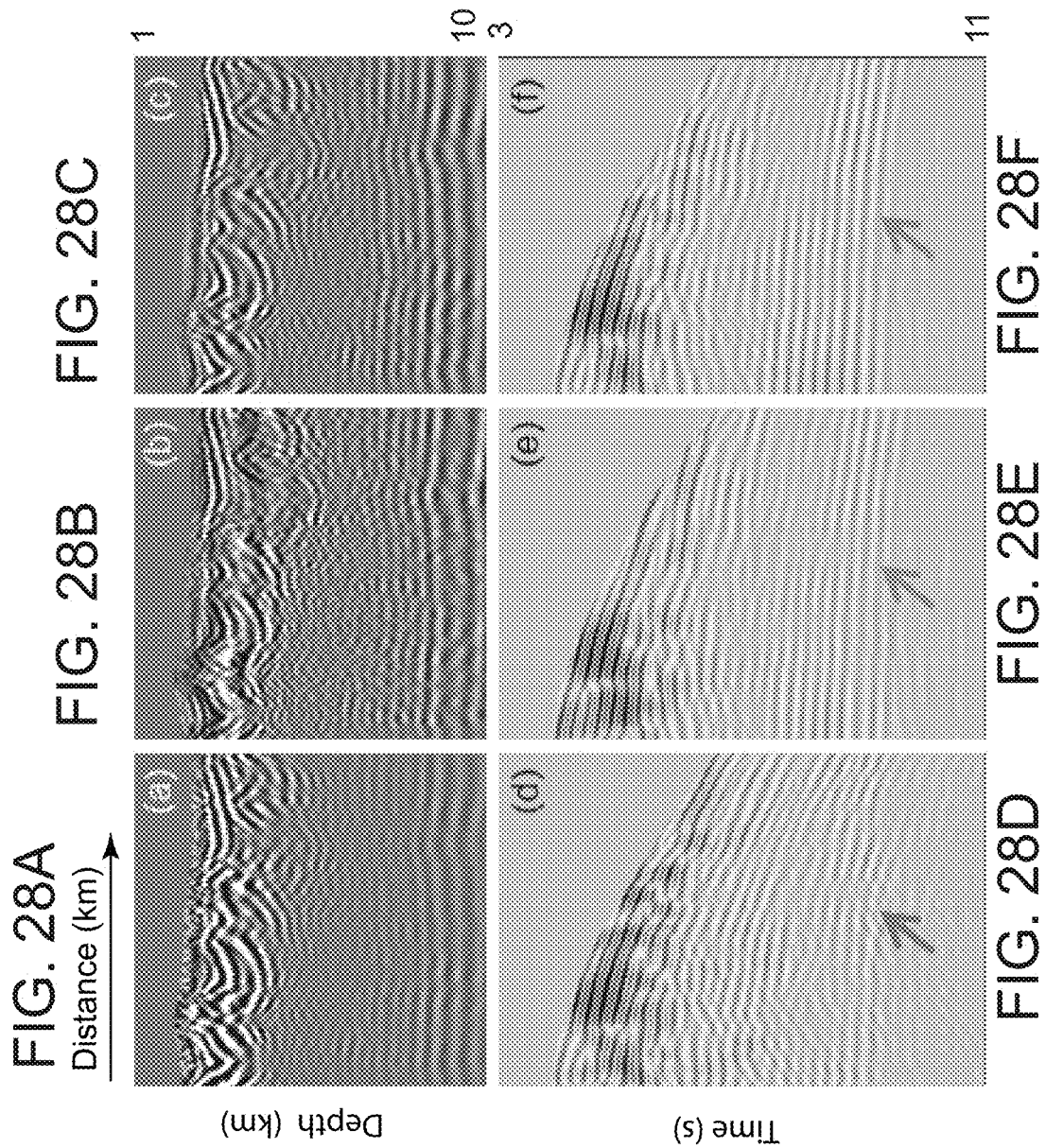

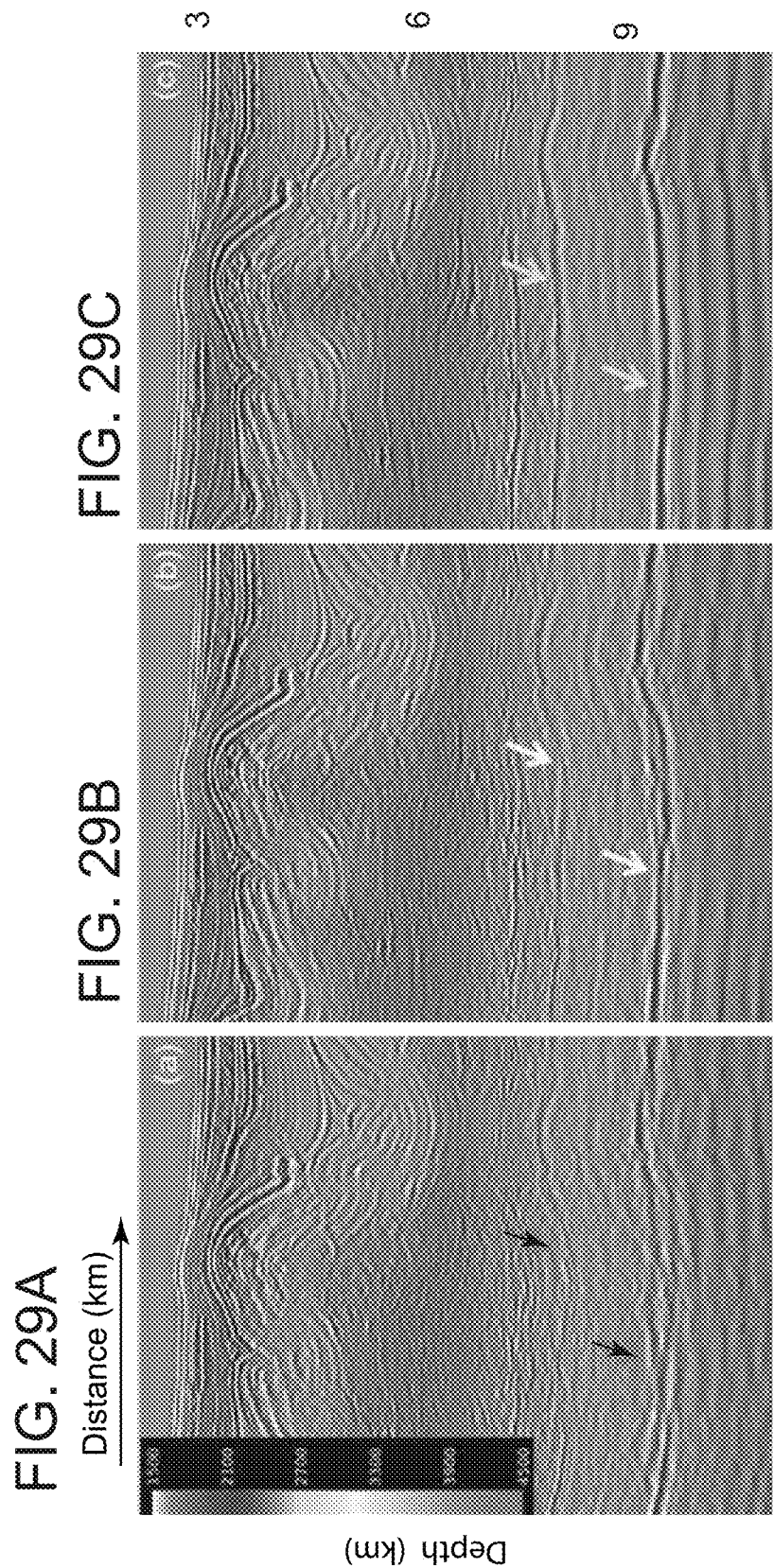

METHODS USING TRAVEL-TIME FULL WAVEFORM INVERSION FOR IMAGING SUBSURFACE FORMATIONS WITH SALT BODIES

CROSS REFERENCE TO RELATED APPLICATIONS

This application claims priority and benefit from U.S. Provisional Patent Application No. 62/650,496 filed on Mar. 30, 2018, for "Method and System for Inverting for Salt Structure with Full Waveform Inversion," U.S. Provisional Patent Application No. 62/650,544 filed on Mar. 30, 2018, for "Method and System for Demigration-based Reflection Full Waveform Inversion Using Offset-dependent Reflectivity Models," and U.S. Provisional Patent Application No. 62/650,689 filed on Mar. 30, 2018, for "Method and System for Improving Reflection FWI Reflectivity Using Single-iteration LSRTM," the contents of which are incorporated in their entirety herein by reference.

BACKGROUND

Technical Field

Embodiments of the subject matter disclosed herein generally relate to methods and systems for seismic exploration, more specifically, to types of full waveform inversion, FWI, techniques that improve the images of explored subsurface formations with salt bodies.

Discussion of the Background

In seismic exploration, data acquisition and processing techniques are employed to generate a three-dimensional (3D) structural image of the explored geophysical subsurface formation. Different components in the formation are identified based on different combinations of geophysical properties (such as seismic propagation velocity, absorption, porosity, asymmetry, etc.) revealed by seismic data processing. While this image does not provide an accurate location for oil and gas, it enables determination of whether hydrocarbons (i.e., oil and/or gas) and other sought-after natural resources are likely present. Such 3D structural images may then be used to design an exploration or exploitation plan (e.g., drilling), and to monitor the structural impact of resource extraction, by comparison with later images. Thus, obtaining high-resolution images of subsurface formations is an ongoing process used in the exploration and exploitation of natural resources, including, among others, oil and/or gas.

During seismic acquisition, seismic sources emit seismic excitations that are detected by seismic receivers after traveling through a geophysical subsurface formation. The interaction of the seismic excitations with the subsurface formations involves multiple phenomena such as reflection, refraction and diffraction. The seismic receivers generate seismic data based on detected seismic excitations (i.e., a seismic signal). Series of sampled seismic signal values at specified times form traces.

During seismic data processing, the traces are used to image the subsurface formation to approximately determine the location of interfaces and nature of the explored subsurface formation's layers (one or more of which may be associated with the presence of oil and/or gas). The impact of known characteristics of the seismic sources and detectors are eliminated from the traces to estimate the subsurface formation's structure.

One of the important pieces of information embedded in the traces is the propagation velocity of the seismic excitation. The propagation velocity (from now on called simpler "velocity" in this document) is characterized by its direction and magnitude. Magnitude is different in different substances and typically also depends on frequency. Seismic data processing builds a velocity model that includes component layer/component's shapes and associated velocity values.

Full-waveform inversion (FWI) is a technique used to generate and enhance high-resolution and high-fidelity models of properties such as velocity. Conventionally available computer resources are insufficient to perform a complete un-approximated FWI starting from seismic data. Therefore, various techniques of approximating FWI have been developed to obtain sufficiently high-resolution and high-fidelity velocity models of an explored subsurface formation.

FWI is considered the most promising data-driven tool to automatically build velocity models by iteratively minimizing the difference between recorded data and modeled synthetic data. Successful examples have been reported using FWI to update models of subsurface formations including shallow sediments, gas pockets and mud volcanoes. More recently, FWI techniques have been successfully used to update velocity models of structures including salt bodies using low-frequency, full-azimuth and long-offset datasets recorded with ocean bottom nodes, OBN.

Two issues that frequently cause FWI to fail are cycle-skipping and amplitude discrepancy between synthetic data and recorded data, particularly if there are sharp contrasts (e.g., when salt bodies are present) in the model. When phases or travel-time differences between synthetic and recorded data are large, the oscillatory pattern of the seismic signals introduces local minima. FWI may attempt to fit the synthetic dataset to a wrong cycle in the recorded dataset. Additionally, the amplitude distribution of recorded dataset is usually very different from that of the synthetic dataset. If this difference is not appropriately addressed, FWI interprets it as a velocity error, which leads the inversion to erroneous velocity models.

Using FWI techniques to update velocity models that contain salt bodies with high-velocity contrasts is challenging. It is even harder if an erroneous salt geometry is part of the velocity model. One key factor in sub-salt body imaging is the salt velocity model correctly determining salt body's geometry. Conventional salt model-building uses tomography, sometimes combined with shallow diving-wave full-waveform inversion (FWI), to build a first best possible sediment velocity model. Then, a sediment-flood migration may be used for top-of-salt (TOS) interpretation, followed by a salt-flood migration for base-of-salt (BOS) interpretation. Then, a number of salt scenario are usually tested to resolve the salt body's geometry, especially for complex interfaces. This method is not only labor-intensive and time-consuming, but it is also prone to human misinterpretation.

Therefore, there is a need to develop better FWI techniques and devices for investigating the structure of a surveyed formation that includes salt bodies.

SUMMARY

Some embodiments use enhanced FWI approaches to determine models of surveyed subsurface formations. One approach uses a travel-time cost function for FWI. These approaches solve the issues of cycle-skipping and amplitude discrepancy observed when conventional FWI is used to process seismic data acquired for a surveyed formation that includes one or more salt bodies.

According to an embodiment, there is a method for seismic exploration. The method includes obtaining an initial velocity model and recorded data for a surveyed subsurface formation, and generating the synthetic data based on the initial model. The method further includes determining time-shifts between the synthetic data and the recorded data so as to achieve a maximum cross-correlation in frequency dependent time windows. The method then includes updating the velocity model using an FWI with a cost function based on the time-shifts. The updated velocity model is used to obtain an image of the surveyed subsurface formation usable to locate natural resources.

According to another embodiment, there is a seismic data processing apparatus having an interface and a data processing unit. The interface is configured to obtain an initial velocity model and recorded data for a surveyed subsurface formation. The data processing unit is configured to generate synthetic data based on the initial velocity model, to determine time-shifts between the synthetic data and the recorded data so as to achieve a maximum cross-correlation therebetween in frequency-dependent time windows, and to update the velocity model using an FWI with a cost function based on the time-shifts. Here too the updated velocity model is used to obtain an image of the surveyed subsurface formation usable to locate natural resources.

According to yet another embodiment, there is a non-transitory computer-readable recording media storing executable codes which when executed by a computer make the computer perform a method for seismic exploration. The method includes obtaining an initial velocity model and recorded data for a surveyed subsurface formation, and generating the synthetic data based on the initial model. The method further includes determining time-shifts between the synthetic data and the recorded data so as to achieve a maximum cross-correlation in frequency dependent time windows. The method then includes updating the velocity model using an FWI with a cost function based on the time-shifts. The updated velocity model is used to obtain an image of the surveyed subsurface formation usable to locate natural resources.

BRIEF DESCRIPTION OF THE DRAWINGS

For a more complete understanding of the present inventive concept, reference is now made to the following descriptions taken in conjunction with the accompanying drawings, in which:

FIGS. 14A and 14B are inline sections of RTM stack for the initial velocity model and the weighted travel-time FWI-updated model, respectively, at deep depth;

FIGS. 21A and 21B illustrate the velocity perturbation overlaid on the raw RTM stack after a) decomposition-based, and b) demigration-based RFWI, respectively;

FIGS. 22A, 22B and 22C are zoomed-in vertical sections of a) the initial velocity model, b) decomposition-based RFWI, and c) demigration-based RFWI;

FIGS. 23A and 23B compare inline and cross-line sections obtained using a) the initial velocity model, and b) the model updated using demigration-based RFWI;

FIGS. 28A-28F are graphs representing reflectivity models obtained using: (a) RTM, (b) iterative LSRTM, and (c) single-iteration LSRTM (CHF) in the top row, and synthetic reflection data: (d), (e) and (f) obtained by demigration using (a), (b) and (c), respectively, in the bottom row;

FIGS. 29A, 29B and 29C illustrate RTM migration using: (a) Initial velocity model, (b) RFWI model using RTM for reflectivity and (c) RFWI model using single-iteration LSRTM, for the reflectivity;

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using the terminology of seismic data acquisition and processing.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

I. Travel-Time Based FWI

Methods and devices according to various embodiments described in this sub-section use an FWI employing a travel-time based cost function based on time-shifts (also known as "travel-time measurements") established within frequency-dependent time windows. A cross-correlation coefficient-based weights may be employed to promote travel-time measurements with high quality.

Figure 1:
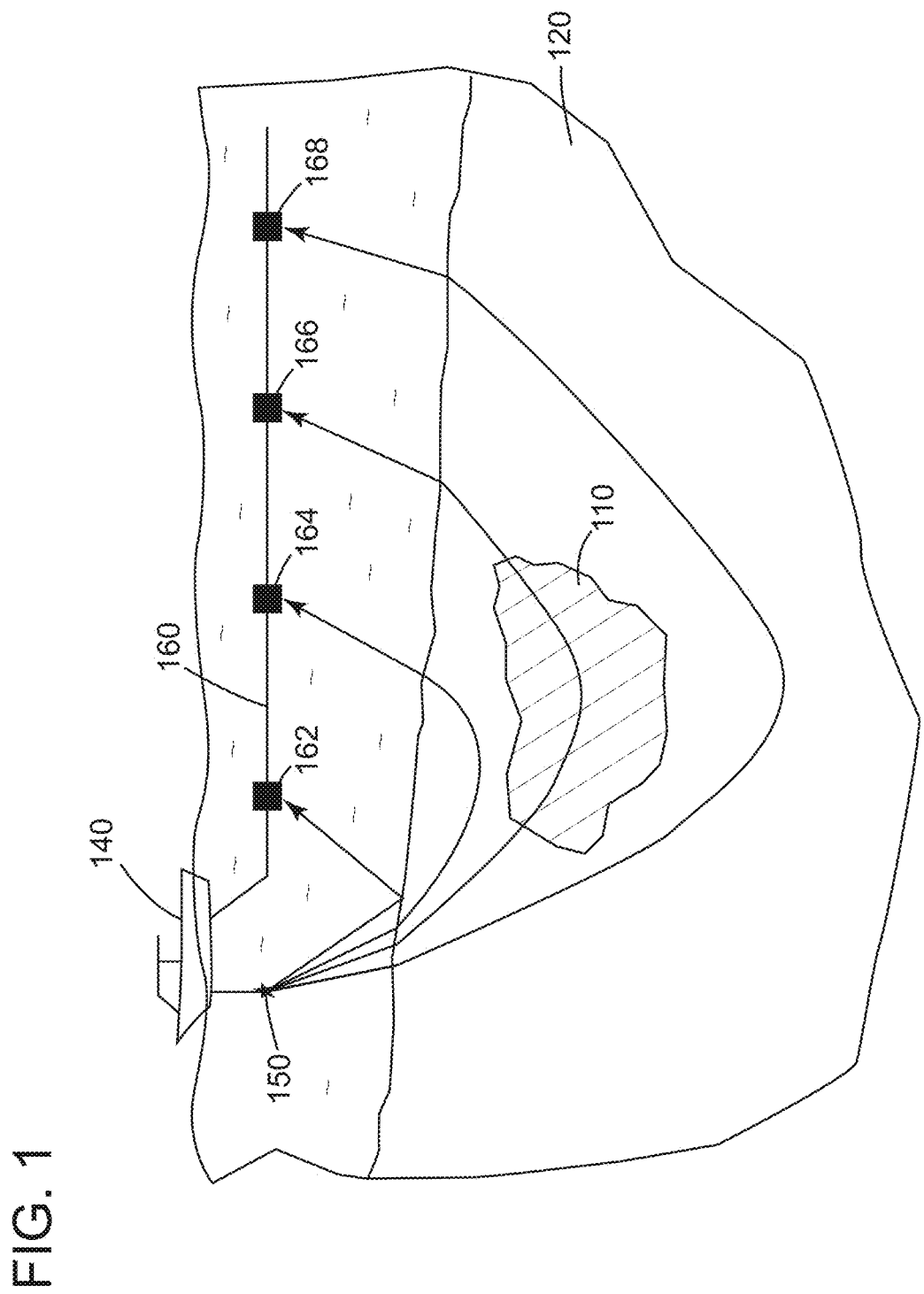
FIG. 1 illustrates marine seismic data acquisition over a formation including a salt body.

FIG. 1 is an inline vertical section illustrating marine seismic data acquisition when a salt body 110 is present in the surveyed formation 120 under seafloor 130. Vessel 140 tows a seismic source 150 and at least one streamer 160 that houses receivers 162, 164, 166, 168. The seismic source generates seismic excitations that penetrate the seafloor and travel through the surveyed formation 120 before being detected by the receivers, which then generate seismic data.

Figure 2:
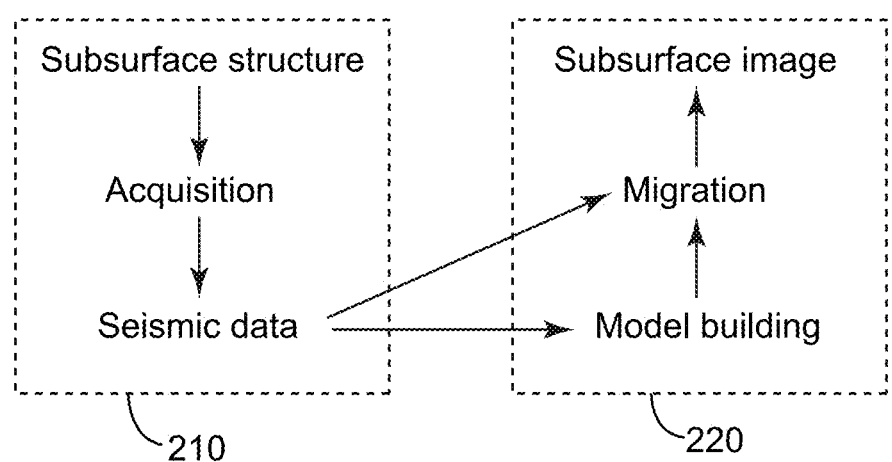
FIG. 2 is a schematic illustration of seismic exploration extracting an image of the subsurface formation from seismic data.

FIG. 2 is a schematic illustration of seismic exploration extracting an image of the subsurface formation from seismic data, the left side 210 corresponding to seismic data acquisition and the right side 220 to seismic data processing.

Conventional FWI uses a least-square cost function χ to update a velocity model m of the surveyed formation so as to minimize the difference between amplitudes of synthetic data u and of recorded data d:

$$\chi(m)=\Sigma_{s,r}[d(t)-u(t,m)]^2 \quad (1)$$

where t is the time, and s and r are the source and the receiver index, respectively.

Compared to the least-squares cost function in equation (1), a travel-time-based cost function is more linear with respect to the difference between an initial velocity model and the actual velocity model. Therefore, this approach reduces the nonlinearity of the inversion and mitigates the cycle-skipping issue. Moreover, conventionally, an acoustic modeling engine is used to simulate the seismic wave propagation process. As a result, there are (A) elastic effects that are not modeled, and (B) uncertainties in the density model. Therefore, the amplitudes of the recorded data and of synthetic data do not match each other. The travel-time-based cost function downplays the amplitude differences, and therefore diminishes the amplitude impact when combined with the acoustic modeling engine.

A basic concept in a travel-time-based cost function is the time-shift (or "travel-time measurement") between the recorded data and modeled synthetic data. The time-shift may be obtained by maximizing the cross-correlation of synthetic (u) and recorded data (d) in a time window between $t_1$ and $t_2$:

$$\Delta\tau = \underset{\tau}{\mathrm{argmax}} \int_{t_1}^{t_2} d(t+\tau)u(t)dt. \quad (2)$$

One challenge is to determine an optimal time window size. On one hand, a short time window ($t_2-t_1$) is required to capture nonstationary variations of the time-shift for different events. On the other hand, a longer time window is preferred when there is strong noise in the input data. A frequency-dependent time window selection technique turned out to be a good fit-for-purpose solution. This technique uses the following formula:

$$L = \frac{k}{f} \quad (3)$$

where L is the window length in seconds (s), k is a user input parameter, usually between 2 and 5, and f is frequency in Hertz (Hz). At low frequencies (e.g., 1-4 Hz), where the wavelet lasts longer-than-average and the data is often noisier, a longer time window is desirable. At high frequencies (e.g., larger than 4 Hz), where the wavelet becomes shorter than at low frequencies and the data becomes less noisy (also, the velocity error is hopefully smaller as well due to a low-frequency FWI update), a shorter time window can be used to measure the time-shifts more precisely.

Another challenge is that the travel-time measurements can be inaccurate due to strong noise and/or due to large differences between the recorded data and synthetic data. The cross-correlation coefficients between (A) the recorded data shifted by the travel-time measurement and (B) synthetic data may be used as weights to reduce the negative impact of poor travel-time measurements or to promote high-quality travel-time measurements. In this case, a weight c may be calculated using the following formula:

$$c(\Delta\tau) = \frac{\int_{t_1}^{t_2} d(t+\Delta\tau)u(t)dt}{\sqrt{\int_{t_1}^{t_2} d(t+\Delta\tau)d(t+\Delta\tau)dt}\sqrt{\int_{t_1}^{t_2} u(t)u(t)dt}}. \quad (4)$$

After obtaining the travel-time measurements and the weights, the FWI travel-time cost function is:

$$\chi(m)=\Sigma_{s,r,w}c(\Delta\tau)\Delta\tau^2, \quad (5)$$

where s and r are the source and the receiver index, respectively, and w is the time window's index. The gradient of this cost function can then be constructed, for example, using the adjoint-state method as described in R. E. Plessix's 2006 article, "A review of the adjoint-state method for computing the gradient of a functional with geophysical applications," published in *Geophysical Journal International*, Volume 167, Issue 2, pp 495-503, which is incorporated herein by reference in its entirety. The adjoint source of the cost function is then given by $$\sum_{s,r,w} c(\Delta\tau)\Delta\tau\frac{\partial}{\partial t}d(t+\Delta\tau). \tag{6}$$

Figure 3:
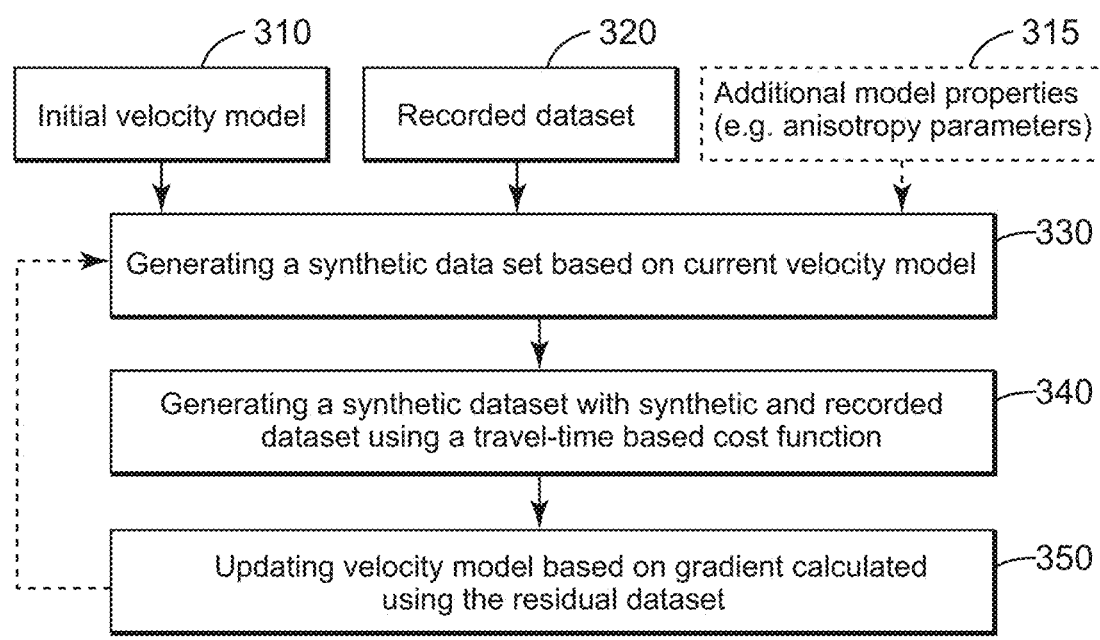
FIG. 3 is a workflow of seismic data processing using FWI with a travel-time based cost function according to an embodiment.

FIG. 3 illustrates workflow of the above-described seismic data processing using FWI with a travel-time based cost function. First, a synthetic dataset is generated based on a current (initial or updated) velocity model 310 and potentially additional model properties 315 (e.g., anisotropy parameters) at 330. Then, at 340, a residual dataset is generated based on the synthetic dataset and the recorded dataset 320 using the travel-time cost function. The velocity model is updated at 350 based on a gradient calculated using the residual dataset. The updated velocity model may then be used as current model to re-generate the synthetic dataset at 330. Steps 330, 340 and 350 may be performed iteratively a predetermined number of times or until a convergence criterion is met.

Figure 4:
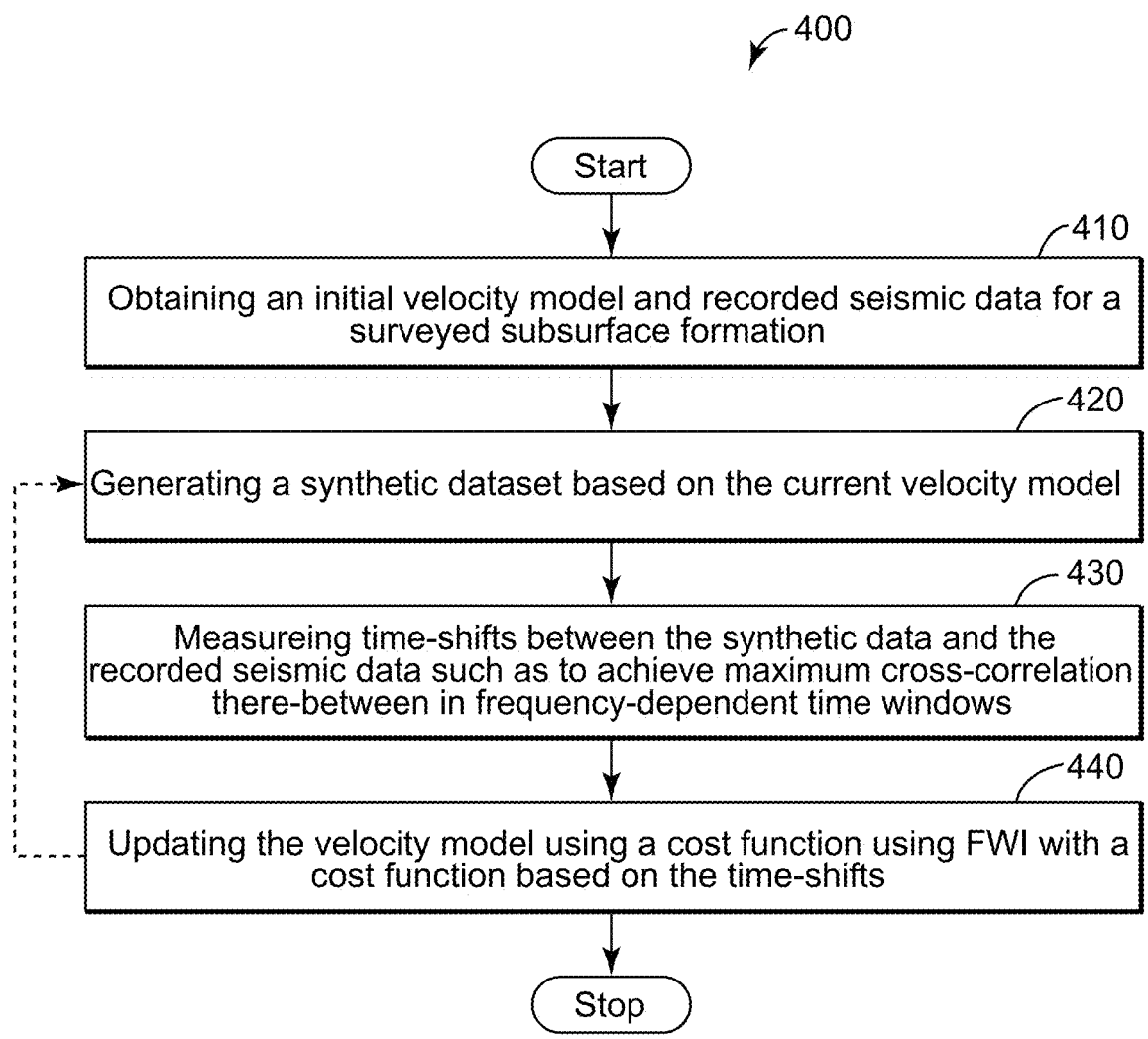
FIG. 4 is a flowchart of a travel-time FWI method according to an embodiment.

FIG. 4 is a flowchart of a method 400 for seismic exploration using FWI employing a travel-time based cost function according to an embodiment. This type of method may be simpler called "a travel-time FWI method." Method 400 includes obtaining an initial velocity model and recorded seismic data for a surveyed subsurface formation at 410. Method 400 further includes generating synthetic data based on the initial velocity model, at 420, and determining time-shifts between the synthetic data and the recorded seismic data such as to achieve maximum cross-correlation there-between in frequency-dependent time windows, at 430. Method 400 then includes updating the velocity model using a travel-time-based cost function based on the time-shifts, at 440. The updated velocity model is used to obtain an image of the surveyed subsurface formation usable to locate natural resources.

For example, the updating of the velocity model may be performed in the manner described in U.S. patent application Ser. No. 13/787,884, whose entire content in incorporated herewith by reference.

Method 400 may also include calculating weights based on cross-correlation of (A) the recorded data shifted according to the time-shifts, and (B) the synthetic data in the respective frequency-dependent time windows. The cost function may be a sum of squared time-shifts multiplied by the respective weights.

Figure 5:
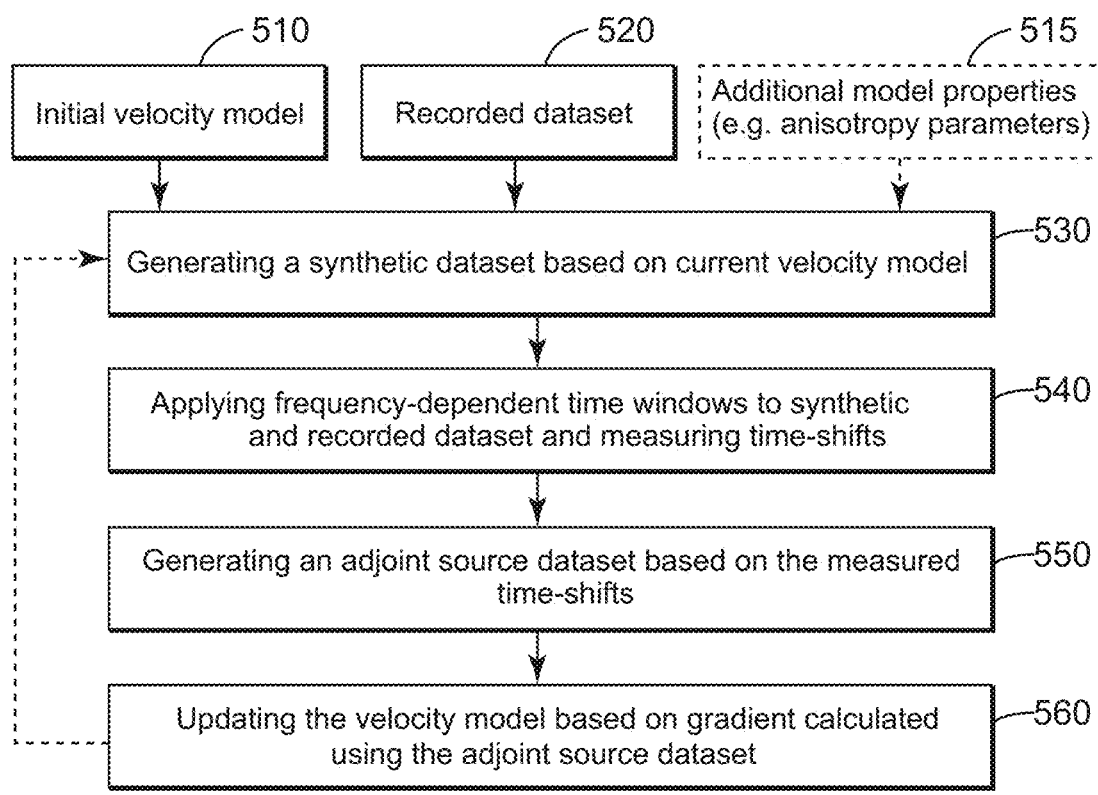
FIG. 5 is a workflow of another travel-time FWI method according to an embodiment.
Figure 6:
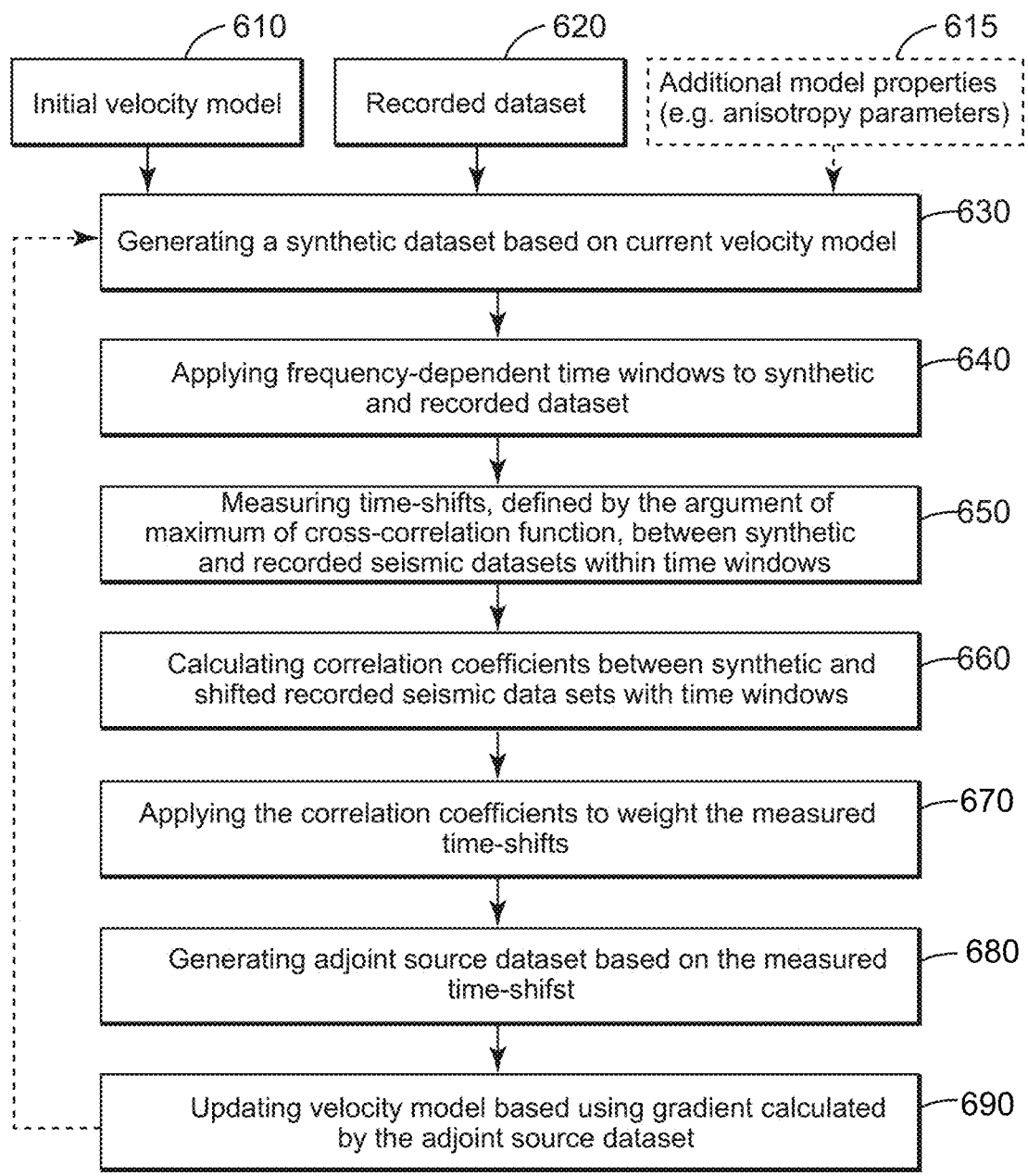
FIG. 6 is a workflow of seismic data processing using weighted travel-time FWI according to another embodiment.

FIGS. 5 and 6 are more detailed workflows of travel-time FWI according to different embodiments. Both workflows start from an initial velocity model (labeled 510 and 610) and the recorded dataset (labeled 520 and 620). The initial velocity model may be a first estimation based on the recorded data (e.g., using tomography). Additional model properties (labeled 515 and 615) such as anisotropy parameters may also be used for generating a synthetic dataset at 530 and 630 respectively.

In FIG. 5, frequency-dependent time windows are applied to the synthetic data and the recorded seismic data, and then travel times are measured, which otherwise said, time-shifts are determined so as to achieve maximum cross-correlation between time-shifted recorded seismic data and synthetic data in respective frequency-dependent time windows at 540. An adjoint source dataset calculated by equation (6) is then generated using the time-shifts at 550. The velocity model is updated based on a gradient calculated using the adjoint source dataset at 460. Steps 530-560 may be repeated a predetermined number of times or until a convergence criterion is met (e.g., cost function is smaller than a predetermined threshold), using the updated velocity model as current velocity model to generate another synthetic dataset at 430.

Returning now to FIG. 6, frequency-dependent time windows are applied to the synthetic and the recorded datasets at 640. Time-shift defined as the quantity that maximizes cross-correlation between synthetic and time-shifted recorded seismic datasets within the frequency-dependent time windows are measured at 650. Correlation coefficients between synthetic and time-shifted recorded seismic datasets within the time windows are calculated at 660.

Then, at 670, the correlation coefficients are applied to weight the time-shifts. An adjoint source dataset is generated using the weighted time-shifts at 680 and the velocity model is updated based on a gradient calculated using the adjoint source dataset at 690. Steps 630-690 may be repeated a predetermined number of times or until a convergence criterion is met.

Figure 7:
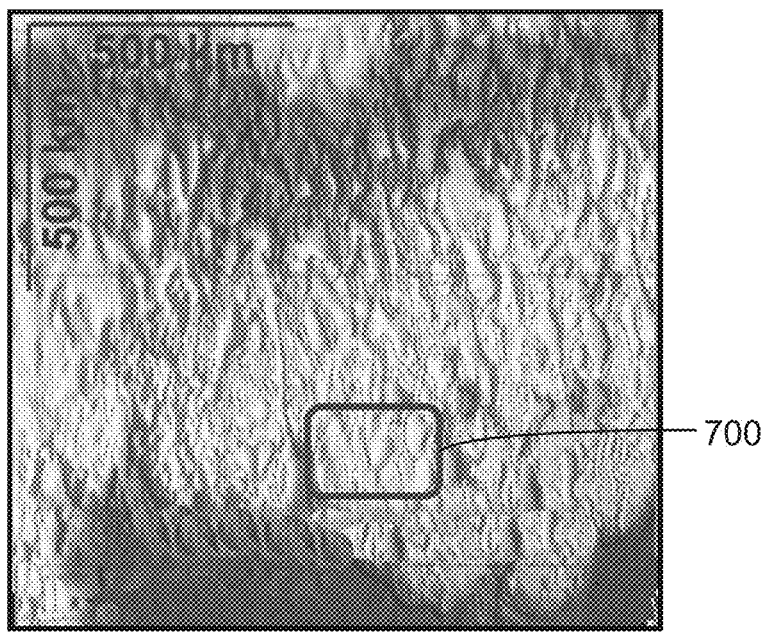
FIG. 7 is a seafloor view of an area in the Gulf of Mexico, GOM, where seismic data used to test the weighted travel-time FWI was acquired.
Figure 8:
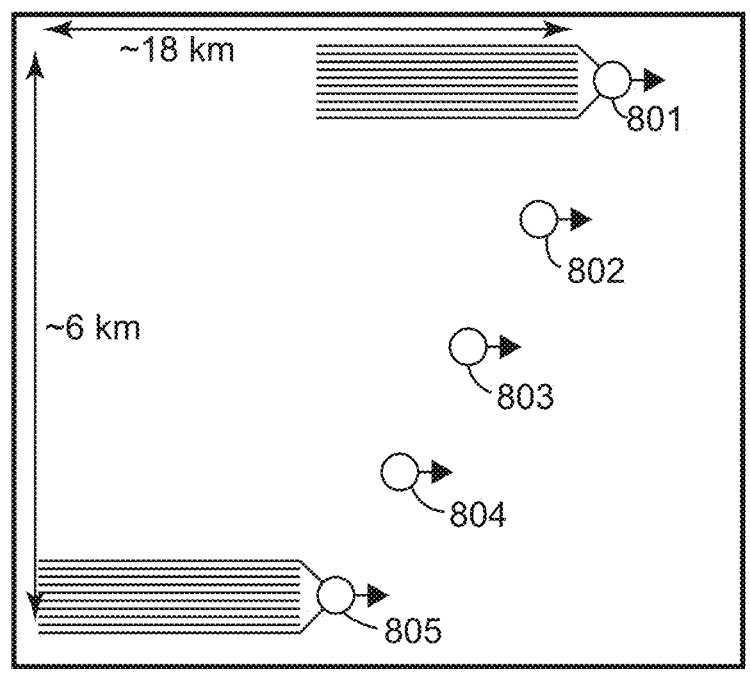
FIG. 8 is a schematic representation of seismic data acquisition equipment used to acquire the seismic data.

The weighted travel-time FWI approach was tested on seismic data acquired in an area that features complex salt structures marked with box 700 in FIG. 7 (which represents an ocean floor view of an area in GOM). The data was acquired using multiple vessels in a staggered configuration (two source-and-streamer-spread vessels 801 and 805, and three source vessels 802, 803 and 804 cross-line and in-line towed in-between the streamer vessels) illustrated in FIG. 8. Vessel 801 is called the leading receiver boat, and vessel 805 is called the tailing receiver boat. Unlike in FIG. 1 where the streamer has the same depth throughout his length, the streamers' depths varied with the distance to the towing vessel from 10 m and 50 m when the test dataset was acquired.

Figure 9:
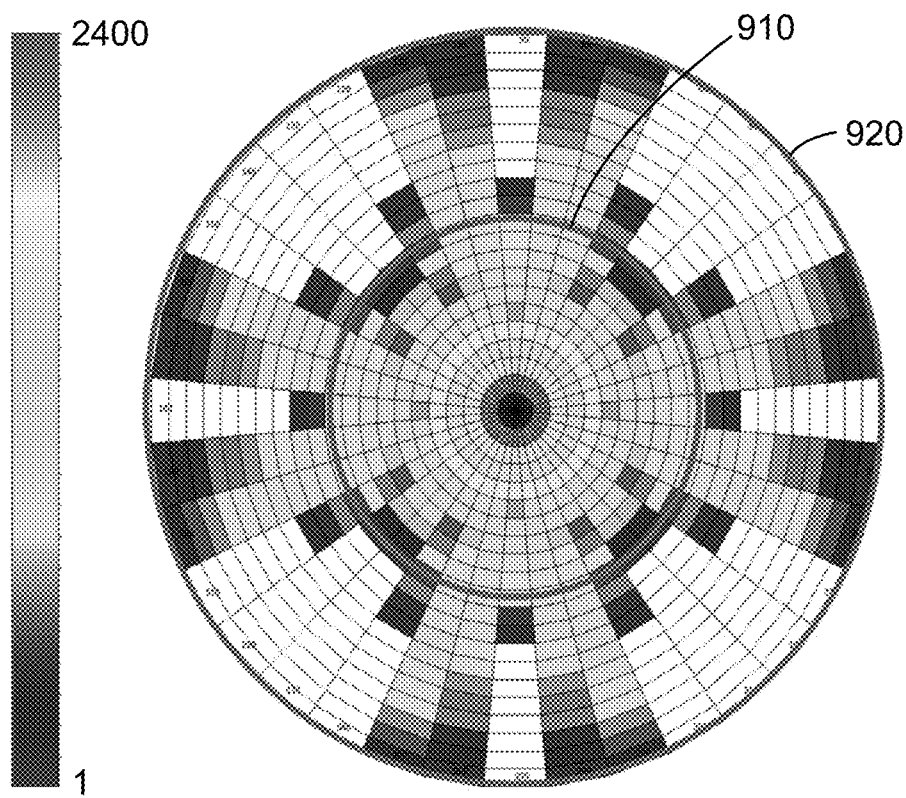
FIG. 9 is a Rose diagram showing angular coverage of the seismic data.
Figure 10A:
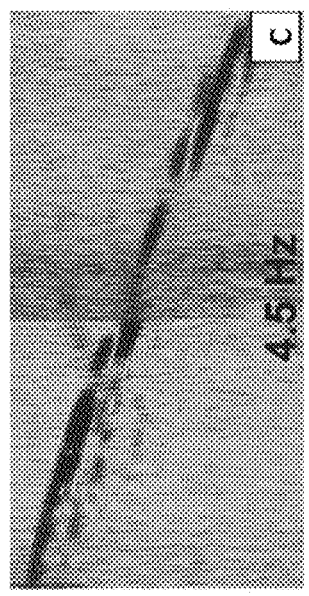
FIGS. 10A-10F are seismic data graphs.
Figure 10B:
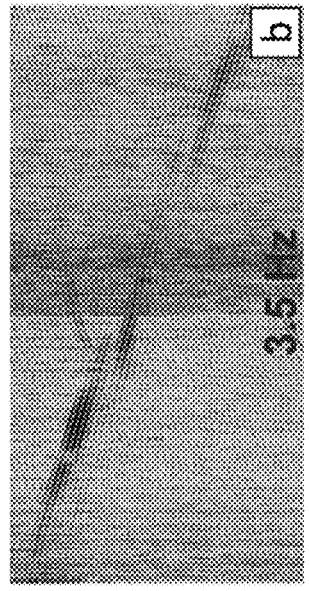
Figure 10C:
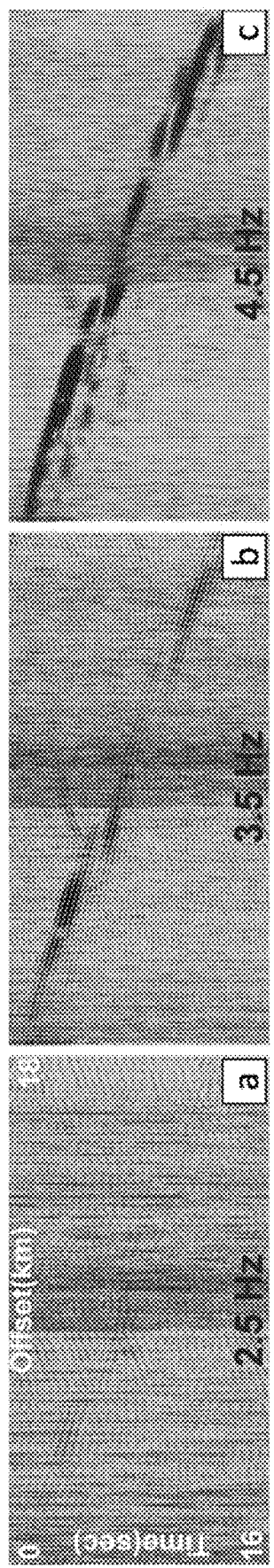
Figure 10D:
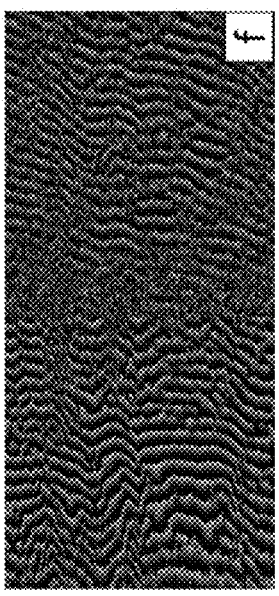
Figure 10E:
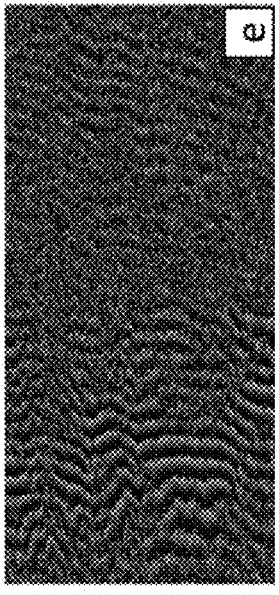
Figure 10F:
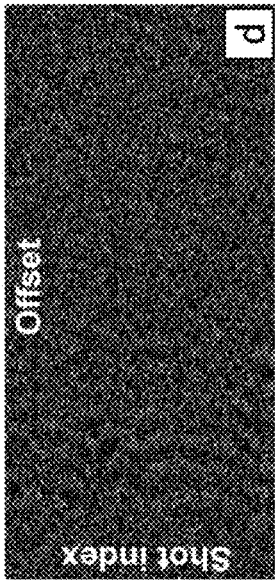

The rose diagram in FIG. 9 illustrates azimuth coverage. Circle 910 corresponds to offset (i.e., distance from source to receiver) of up to 10 km and circle 920 corresponds to offsets up to 18 km. The different nuances of gray in FIG. 9 represent differences in the number of recorded traces in each bin covering about 10° and about 1 km offset.

FIGS. 10A-10F are graphs illustrating seismic data in the time-domain (the top row, FIGS. 10A-10C) and in the phase-domain (the bottom row, FIGS. 10D-10F) Since the data acquisition system moves, the phase for each shot is different from the phase of a previous shot and the phase of a subsequent shot. The columns of this matrix represent data for signals around 2.5, 3.5 and 4.5 Hz, respectively. Vertical axis on top row is time in a range of 0-16 s, vertical axis on bottom row is shot number in a range of 0-2500 (one row for each shot) and horizontal axis for all graphs is offset in a range of 0-18 km. In the upper row, the darker features from the left top corner to the right bottom one is signal, and the localized slightly darker bands around 9 km offset and other features are noise. One notices in the bottom graphs that noise causes unclear images.

Since the weighted travel-time FWI is still mostly driven by diving-wave energy, a testing area was deliberately chosen where the salt body is at a shallow depth of 4-5 km, and, thus, well-sampled by the diving waves detected in this dataset. The initial velocity model is a smoothed version of a legacy model that was obtained after several iterations of ray-based reflection tomography and a diving-wave FWI for the overburden method, followed by salt interpretation and subsalt velocity scans. Similar to most other FWI approaches, the lower frequency bands are processed first using the weighted travel-time FWI. The very low signal-to-noise (S/N) ratio around 2.5 Hz suggests starting seismic data processing with the frequency band centered on 3.5 Hz. However, better results are obtained when the weighted travel-time FWI starts with the frequency band of 2.5 Hz instead of 3.5 Hz. This indicates that weighted travel-time FWI has good tolerance for low-frequency noise because of the frequency-dependent time-window travel-time cost function and the cross-correlation coefficient-based weight function.

Figure 11A:
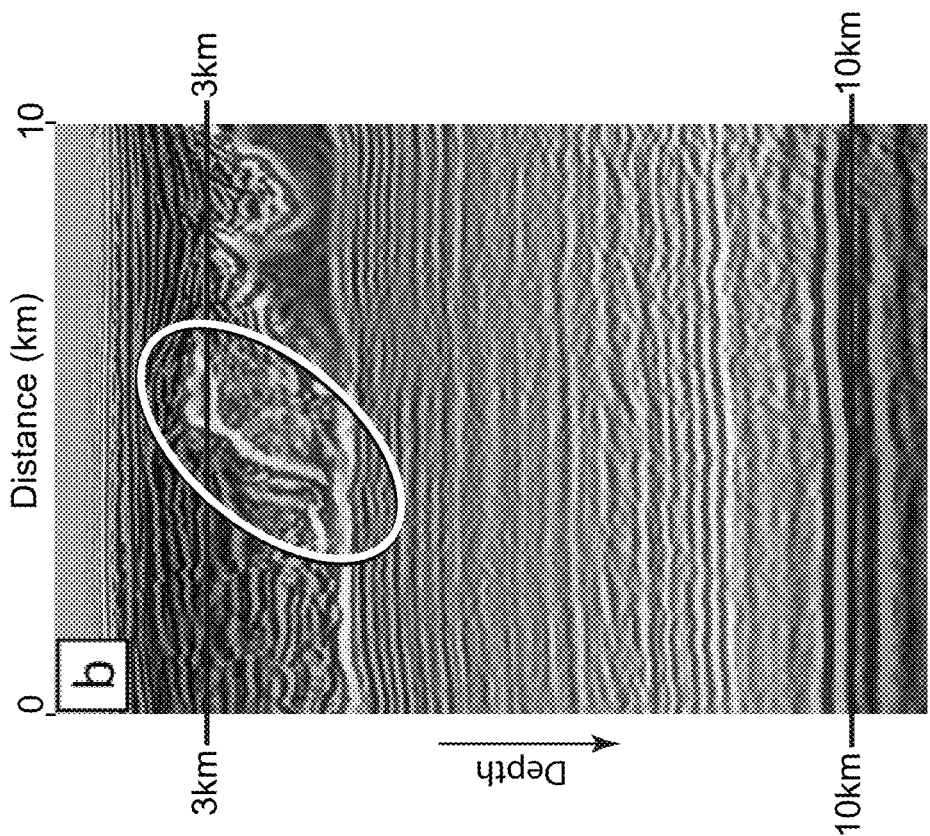
FIGS. 11A and 11B are inline vertical slices with velocity overlaid on RTM stacks for an initial velocity model and for the velocity model after using weighted travel-time FWI.
Figure 11B:
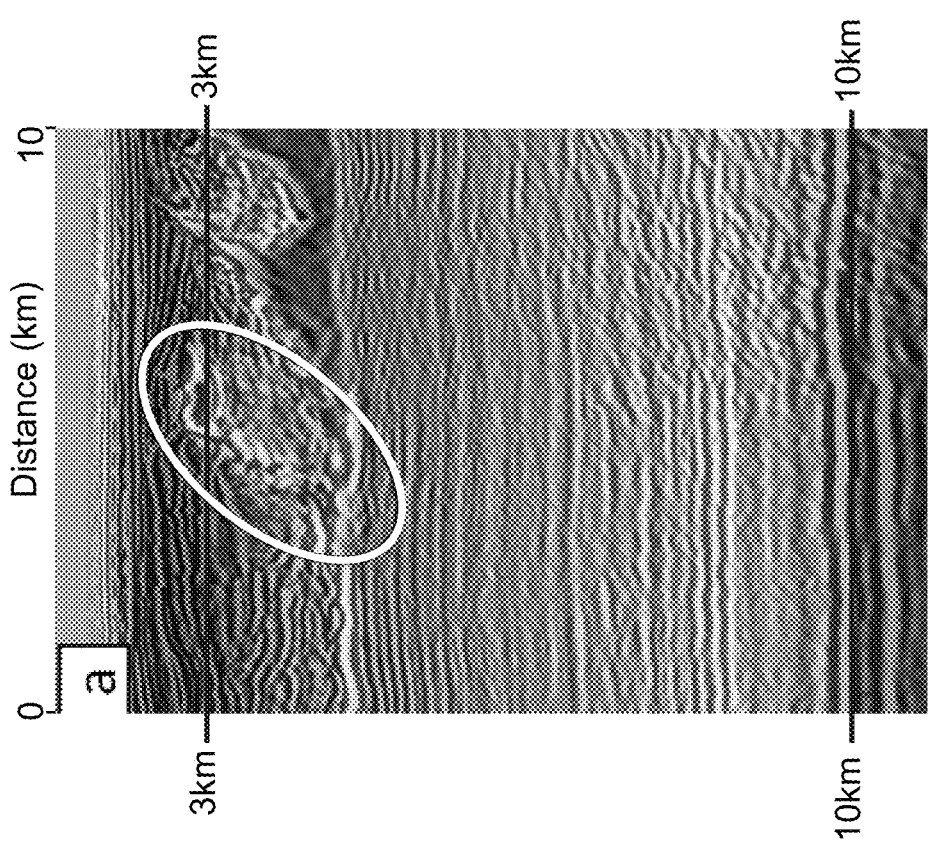

FIGS. 11A and 11B are inline vertical sections generated with velocity model overlaid on the reverse-time migration (RTM) stack images for the initial velocity model (which is a smoothed version of the legacy model) and the weighted travel-time FWI-updated model, respectively. The vertical axis is depth in km with a depth of 3 km and 10 km marked by horizontal lines, and horizontal axis is a horizontal dimension in a range of about 10 km. As expected, the velocity update obtained with the weighted travel-time FWI is very small in the shallow sediment. There are some detailed changes around the TOS, especially at the salt finger marked by the white circles, and the salt geometry is slightly reshaped.

Figure 12A:
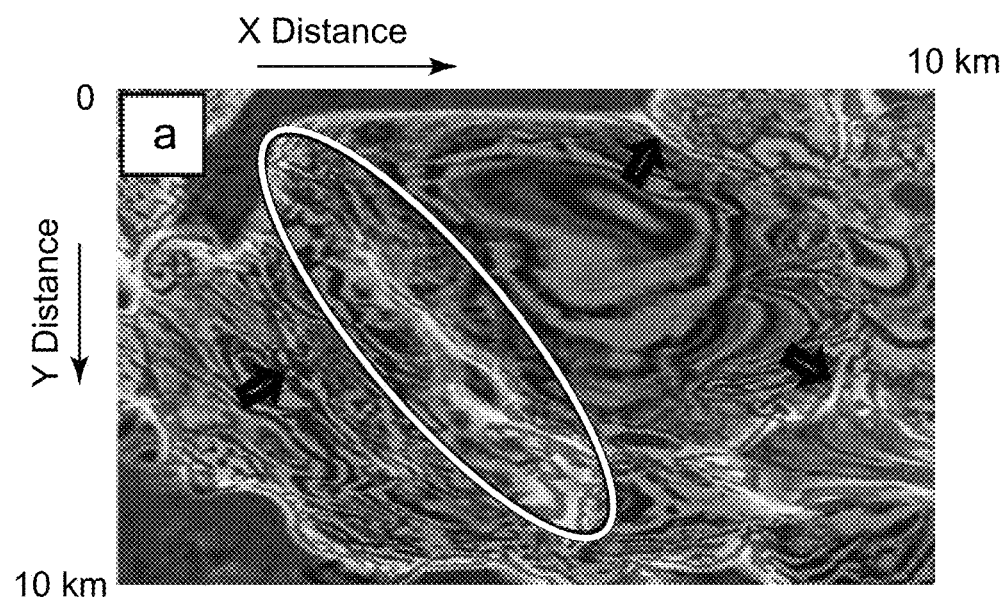
FIGS. 12A and 12B are horizontal cross-sections (slices at a depth of about 3 km) with velocity overlaid on RTM stacks for an initial velocity model and for the velocity model after using weighted travel-time FWI.
Figure 12B:
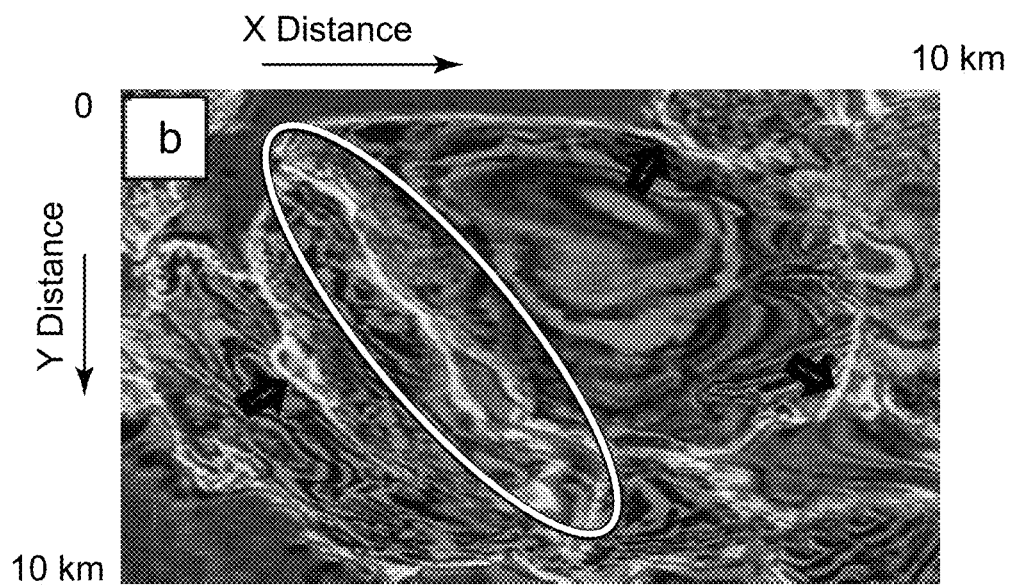

The salt geometry changes are more noticeable on a shallow depth slice at a depth of about 3 km illustrated in FIGS. 12A and 12B. As in case of FIGS. 11A and 11B these images were generated using the initial velocity model and the weighted travel-time FWI-updated model, respectively. Although slightly sharper than in the initial velocity model, the salt boundary after weighted travel-time FWI is smooth overall compared to the salt model built with a conventional FWI (as in equation (1)). This is partly because an initial model with a smooth salt boundary has been used to begin with and the weighted travel-time FWI was performed only up to 6.3 Hz. Sharper salt boundaries are expected at higher frequencies. Improvement areas are indicated with the arrows and the perimeter marked in FIG. 12B.

Figure 13A:
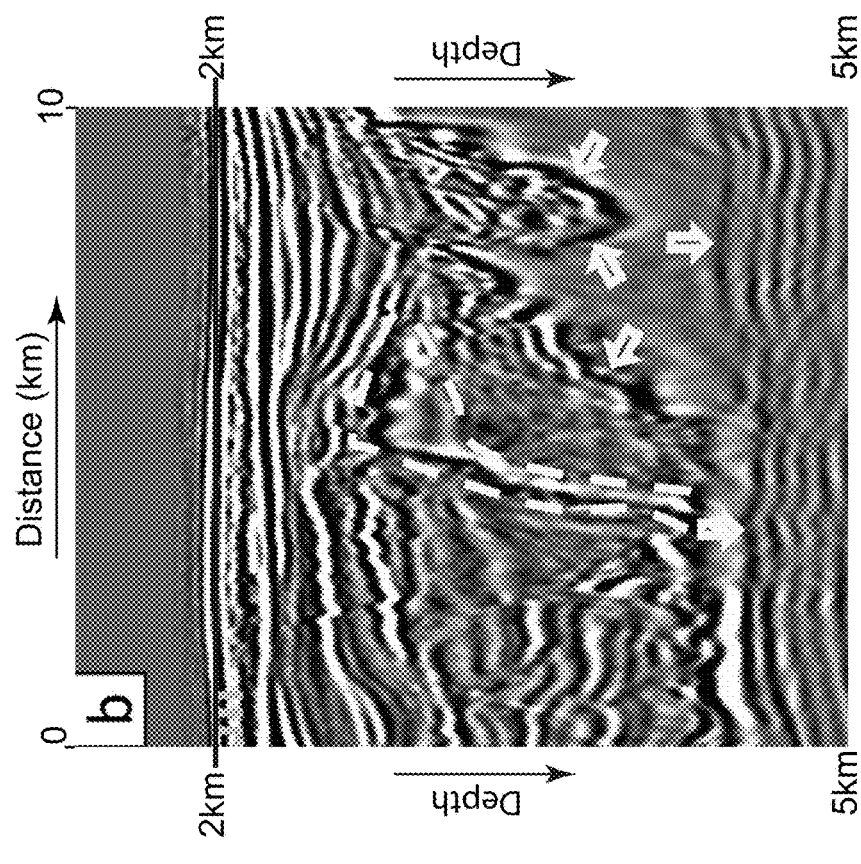
FIGS. 13A and 13B are inline sections of RTM stack for the initial velocity model and the weighted travel-time FWI-updated model, respectively, at shallow depth.
Figure 13B:
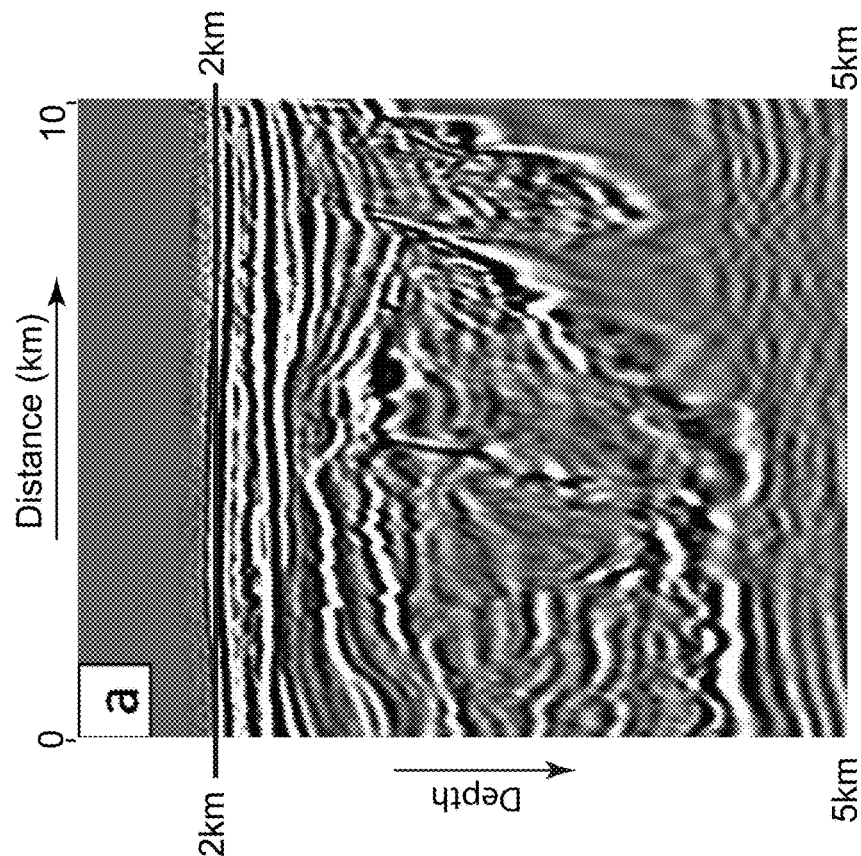

Further, FIGS. 13A and 13B are inline sections of RTM stack for the initial velocity model and the weighted travel-time FWI-updated model, respectively, at shallow depth (2-5 km). One notes that the encircled salt finger is poorly imaged with the initial model, whereas it is well-imaged with a clearly defined overhang boundary after applying the weighted travel-time FWI. Both the TOS and BOS are better imaged using the weighted travel-time FWI model (pointed by the arrows in FIG. 13B).

FIGS. 14A and 14B also represent the RTM stack images obtained with the initial model and the weighted travel-time FWI-updated model in a depth window from 6-10 km. The image improvement achieved with the weighted travel-time FWI is visible at 10 km depth (emphasized with a circle in FIG. 14B).

Thus, the weighted travel-time FWI uses frequency-dependent time-windows to determine time-shifts (otherwise said, measure travel times) and a travel-time cost function to mitigate the cycle-skipping and amplitude discrepancy issues between synthetic data and recorded seismic data. The use of cross-correlation coefficient-based weights promotes travel-time measurements with high quality. The field data examples show that with the well-acquired data and the right geologic setting, this approach is capable of updating salt geometry and thus improving TOS and BOS imaging, as well as subsalt imaging down to 10 km. Although the velocity updates are subtle overall, their impact on the image is significant. These subtle changes are very hard to resolve with the conventional FWI approach.

Further, the weighted travel-time FWI remains mostly driven by diving-wave energy, but reflection data is also used when the diving-wave energy is adequate for FWI to provide a good enough low-wavenumber background velocity model. Low-frequency, long-offset, and full-azimuth data is still required to update complex salt structure velocity models adequately. In the example presented here, the dataset has full azimuth up to 10 km and long offsets up to 18 km with a usable frequency down to 2.5 Hz, which is a much better dataset than most existing towed-streamer data. Furthermore, the salt body in this area is shallow at ~4-5 km depth and thus is well-sampled by the diving-wave energy of this dataset. The deeper the salt body (e.g., >6 km salt depth), the longer offsets and lower frequencies required.

Using weighted travel-time FWI likely has a particularly significant impact for sparse ocean bottom nodes data with a low-frequency source, leading to an economic yet adequate solution for automatic FWI in complex salt areas, with much less human interpretation than commonly practiced during the last two decades.

This approach solves the issues of cycle-skipping and amplitude discrepancy observed when conventional FWI is applied to seismic data acquired for a surveyed formation that includes one or more salt bodies.

The methods described in this section I may be performed using a seismic data processing apparatus including an interface and a data processing unit as described later and exemplarily illustrated in FIG. 35. These methods may also be embodied into computer executable codes non-transitorily stored on a computer-readable recording medium.

II. Demigration-Based Reflection FWI Using Offset-Dependent Reflectivity Models

Reflection FWI is effective at providing low-wavenumber velocity (low wavenumber means<<f/v frequency divided by propagation velocity) updates for deep areas beyond the penetration depth of diving waves and significantly improves seismic imaging. However, the tomographic term of the FWI gradient that is good for low-wavenumber velocity updates can be contaminated by the much stronger high-wavenumber (i.e., close to f/v) migration term.

Methods and devices according to various embodiments described in this sub-section are based on Born modeling and thus are free from contamination of the migration term. Additionally, a set of partial stacks may be used as reflectivity models for Born modeling to reduce the risks of cycle-skipping and incorrect update sign. Further, a travel-time cost function may be used to mitigate the negative impact from amplitude mismatch between input data and modeled synthetic data. A traditional data difference cost function in equation (1) may alternatively be used. The benefit and effectiveness of this approach is illustrated using a seismic dataset acquired in the GOM.

Conventional FWI is commonly used for high-resolution velocity updates on top of ray-based reflection tomography. However, conventional FWI is mostly driven by diving waves and usually can only resolve the velocity for the shallow region due to limited depth of penetration. Reflection energy is needed for the inversion to resolve the velocity for deep targets. Such energy generates FWI gradients of two types: the tomographic term and the migration term (formula for these terms can be found in the article "Inversion=migration+tomography" by P. Mora, published in 1989 *Geophysics*, vol. 54(12), pp. 1575-1586, the entire content of which is incorporated herewith by reference). The migration term has almost no impact on the kinematics, but it is much stronger than the tomographic term because the former corresponds to first-order scattering, which is one order lower than the latter. Therefore, it is beneficial to suppress the migration term for low-wavenumber velocity model updates.

Figure 15A:
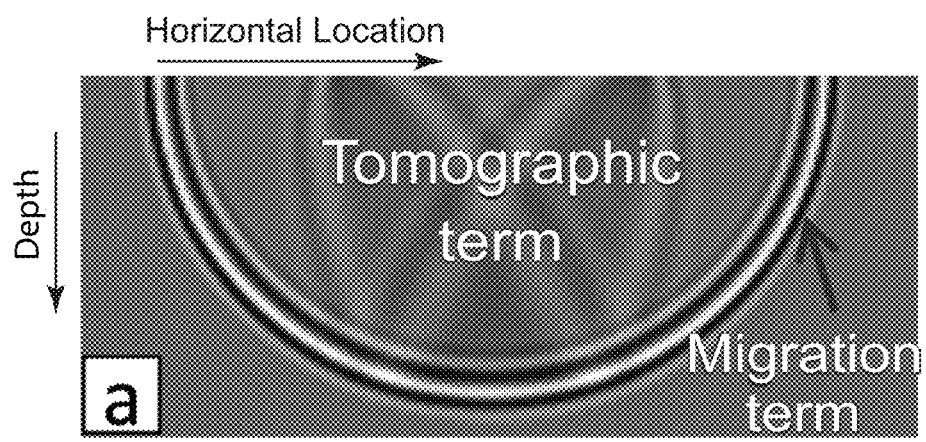
FIGS. 15A, 15B, and 15C are graphs of gradients for a single trace and a single reflection event in a) conventional FWI; b) decomposition-based reflection FWI (RFWI); c) demigration-based RFWI.
Figure 15B:
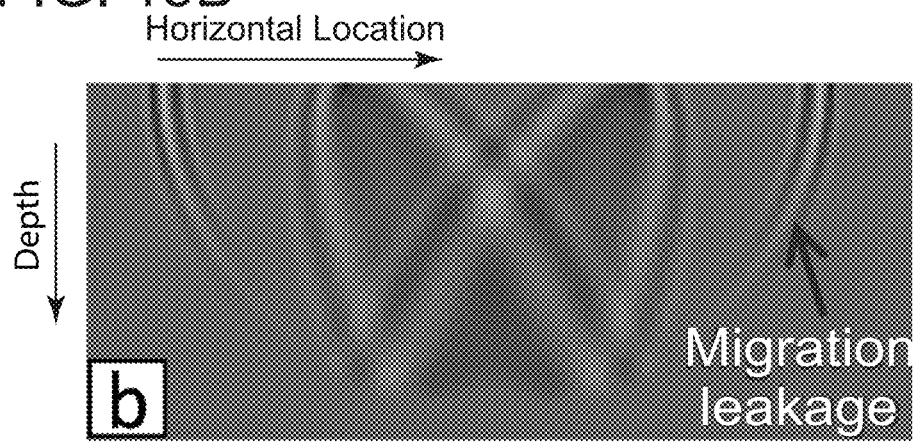

One approach to suppressing the migration term is a two-stage strategy. In the first stage, an artificial density model is derived from the migration term. This density model contains the sharp contrasts needed to produce the tomographic term for the low-wavenumber velocity update in the second stage. Wavefield decomposition based on the vertical Hilbert transform is used to separate the migration term and the tomographic term. This workflow proves to be very effective in improving the velocity and the seismic image for deep targets. However, strong migration leakage may be observed around high-dip events due to the limitation of the vertical Hilbert transform (FIG. 15B).

Another approach to naturally avoid the negative impact of the migration term is to decompose the velocity model. In this approach, the model is first decomposed into long-wavenumber and short-wavenumber components. Born modeling is then performed using the former as the background velocity model and the latter as the reflectivity model to explicitly generate the low-wavenumber tomographic term (which has the aspect of rabbit ears in FIG. 15C). One benefit of demigration using the stacked image as a reflectivity model is that the kinematics of the synthetic data are often close to that of the input data at near offsets. However, when the velocity error is large, cycle-skipping may still happen at large offsets because their imaging points can be far away from stationary stacking points. This can lead to a reflection FWI (RFWI) gradient with wrong directions for long-offset data. In addition, like most other FWI approaches, the amplitude mismatch between input data and modeled synthetic data causes difficulties in computing data residual and velocity gradient.

A solution to the above-identified problems and drawbacks is an RFWI method that adopts Born modeling to explicitly generate the tomographic term, uses a set of partial stacks as reflectivity models to mitigate the possible cycle-skipping and wrong update sign issues, and then uses a travel-time cost function (described in the previous section) to partly address the amplitude mismatch between input data and modeled synthetic data. The benefit and effectiveness of this approach is illustrated with synthetic data as well as seismic data acquired in the GOM.

Figure 15C:
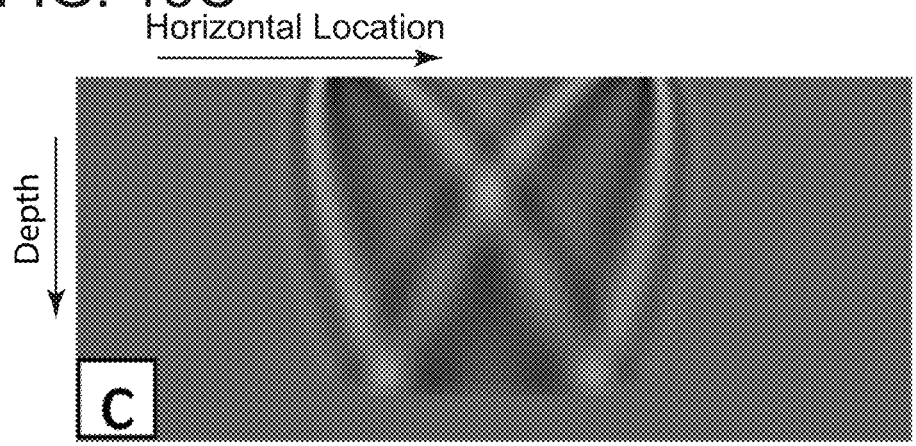

Conventional FWI seeks a model m(x) that minimizes the square residual cost function:

$$C(m) = \iiint dsdrd\omega \tfrac{1}{2}\|R(r,\omega,s,m)\|^2 \quad (7)$$

where R(r, w, s; m) is the data residual between input data $d_0(r, \omega, s)$ and modeled synthetic data $d_{syn}(r, \omega, s; m)$, with s and r as the source and receiver locations and w is the angular frequency. The solution is normally sought using gradient-based methods, and the gradient can be written as:

$$g(x) = \iint dsdr \int \omega^2 S(x,\omega,s;m) R(r,\omega,x;m) d\omega \quad (8)$$

with S(x, ω, s; m) being the source wavefield and R(s, ω, x; m) being the back-propagated residual wavefield at location x. If the input data and the synthetic data are decomposed into diving waves and reflection waves, the FWI gradient computed using formula (8) for reflection energy contains two terms: the migration term and the tomographic term. FIGS. 15A, 15B and 15C are vertical slices representing the FWI gradient's as nuances of gray for one single trace and one single reflection event in: a) conventional FWI, b) decomposition-based RFWI, c) demigration-based RFWI, respectively. The migration leakage in b) is due to the limitation of wavefield decomposition using the vertical Hilbert transform. A comparison of two existing approaches for extracting the tomographic term from the RFWI gradient is set forth below, before detailing an RFWI strategy free from migration leakage and better handling of cycle-skipping and amplitude mismatch between input data and synthetic data.

1. RFWI Based on Wavefield Decomposition

The gradient in formula (8) can be separated into two terms using a wavefield decomposition method:

$$\begin{cases} g_t(x) = \tfrac{1}{2} \iint dsdr \int \omega^2 [S(x,\omega,s)R(r,\omega,w;m) + \\ \qquad H_z(S(x,\omega,s))H_z(R(r,\omega,x;m))] d\omega \\ g_m(x) = \tfrac{1}{2} \iint dsdr \int \omega^2 [S(x,\omega,s)R(r,\omega,x;m) - \\ \qquad H_z(S(x,\omega,s))H_z(R(r,\omega,x;m))] d\omega \end{cases} \quad (9)$$

where $H_z$ represents the Hilbert transform. This method is described in the article, "An effective imaging condition for reverse-time migration using wavefield decomposition," by Liu, F. et al., published in *Geophysics, Vol.* 76, No. 1, 2016, pp. S29-S39, the entire content of which is incorporated herewith by reference.

In view of formula (9), the two-stage RFWI method includes: a first stage in which the high-wavenumber component $g_m(x)$ of the gradient is used to estimate an artificial density model serving as the sharp contrast for rabbit-ear (as in FIG. 15C) generation, and a second stage in which the low-wavenumber component $g_t(x)$ of the gradient is used to update the velocity model. This decomposition-based RFWI is effective overall at extracting the tomographic term for the low-wavenumber velocity update, but some contamination from the tomographic remains around high-dip structures from the migration term due to the intrinsic limitation of the vertical Hilbert transform is visible in FIG. 15B.

2. RFWI Based on Born Modeling

Instead of using wavefield decomposition to separate the migration and tomographic terms, another approach set forth below splits first the velocity model into two parts:

$$m = m_0 + \delta m \quad (10)$$

where $m_0$ contains the long-wavelength components, and δm contains the short-wavelength components. Another two-step procedure is then used. In the first step, model $m_0$ is fixed while δm is updated similar to least-squares migration (with the gradient being the same as that in (10) but requiring a Laplacian filter or other filters to remove the back-scattered noise). In the second step, the short-wavelength model δm is fixed while $m_0$ is updated, where the rabbit-ears are explicitly computed using δm as the reflectivity model and the current background velocity model $m_0$:

$$g_d(x) = \iiint \omega^2 [\tilde{S}(x,\omega,s;m_0,\delta m)R(r,\omega,x;m_0) + S(x,\omega,s;m_0)\tilde{R}(r,\omega,x;m_0,\delta m)] d\omega dsdr \quad (11)$$

where $\tilde{S}$ and $\tilde{R}$ are the first-order source and receiver Born scattering, respectively. The benefit of this approach is that it is free from migration contamination (as visible in FIG. 15C) because only the second-order scattering is kept in the gradient through the cross-correlation between the source or receiver (residual) wavefield and the first-order scattered energy from Born modeling.

Figure 16:
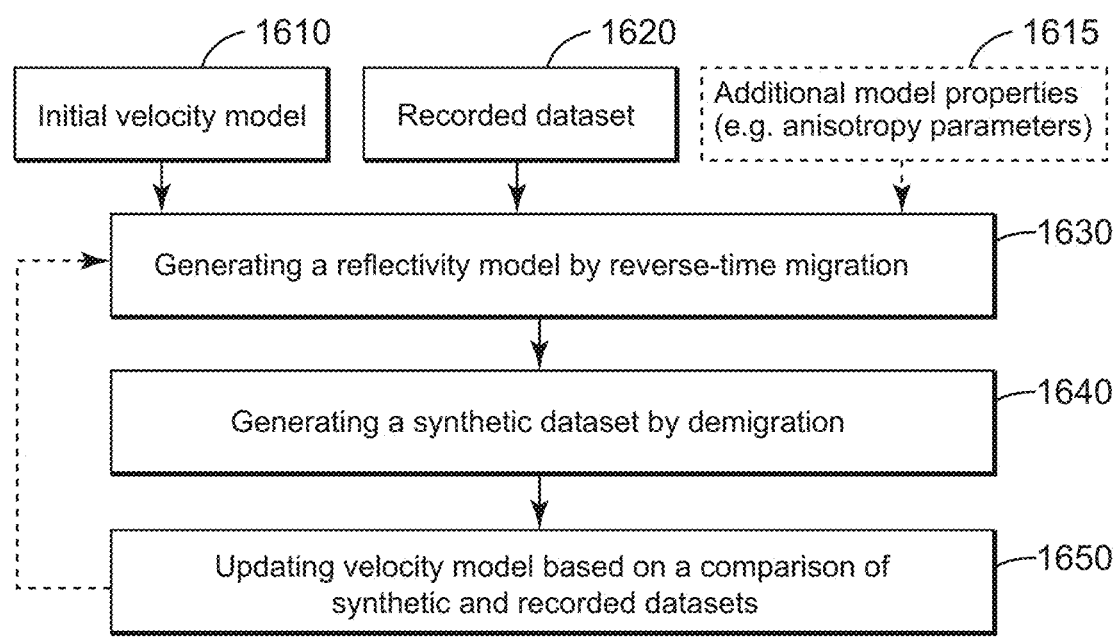
FIG. 16 is a workflow of demigration-based RFWI.

The above-described RFWI-based wavefield decomposition and the RFWI based on Born modeling are examples of demigration-based RFWI. FIG. 16 is a workflow of a demigration-based RFWI. Starting from an initial velocity model 1610 and a recorded dataset 1620, a reflectivity model is generated by reverse-time migration at 1630. Additional model properties (such as anisotropy parameters) 1615 may also be used at 1630. A synthetic dataset is then generated by demigration at 1640. Using an FWI technique at 1650, the velocity model is updated based on a comparison of synthetic and recorded datasets.

Figure 17:
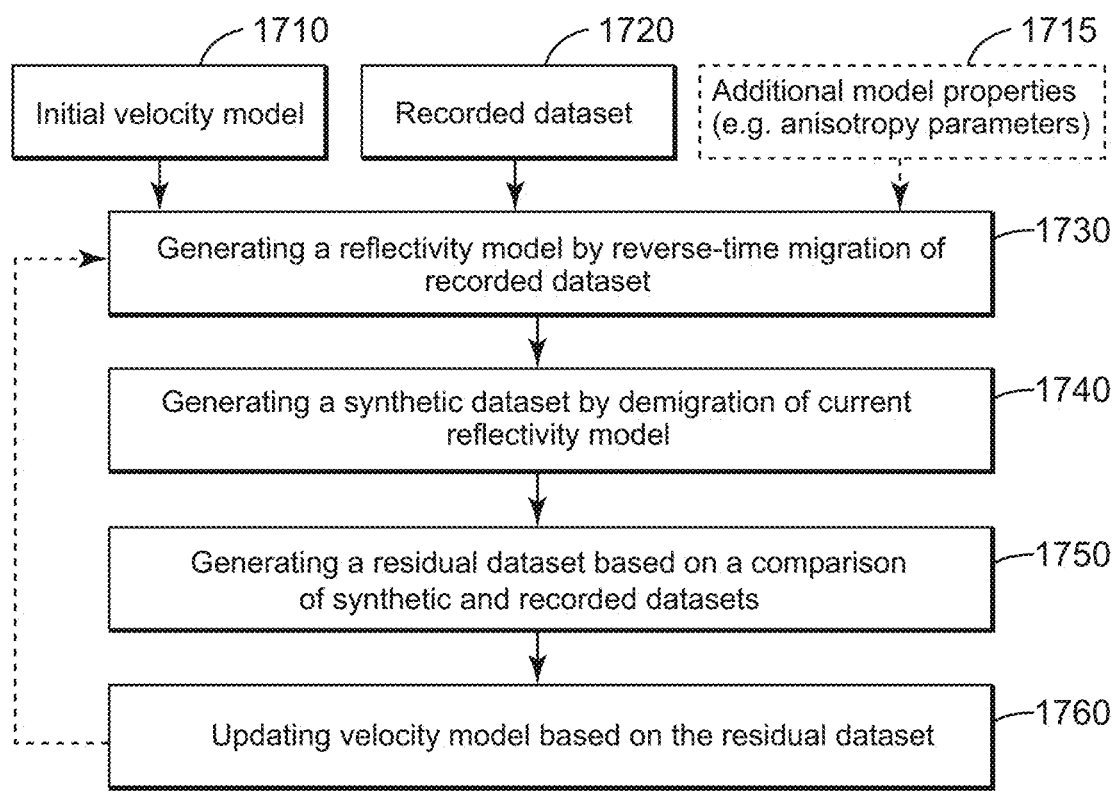
FIG. 17 is another workflow of demigration-based RFWI.

An alternative workflow of demigration-based RFWI is illustrated in FIG. 17. The inputs 1710, 1715 and 1720 and steps 1730 and 1740 are same as the inputs 1610, 1615 and 1620 and steps 1630 and 1640 in FIG. 16. Then, at 1750, a residual dataset is generated based on a comparison (travel-time cost function) of the synthetic and recorded datasets. The velocity model is then updated based on the residual dataset at 1760.

Demigration-based RFWI techniques encounter two major challenges: 1) the amplitude mismatch between input data and modeled synthetic data during residual computation (R and R̃ in (11)), which is common to most FWI approaches, and 2) the use of a stack image as the reflectivity/density model for scattered wavefield computation. The following improved demigration-based RFWI overcomes these challenges.

3. An Improved Demigration-Based RFWI

The acoustic Born-modeled synthetic data often has different amplitudes compared to the recorded input data. This requires some sort of data-matching when computing the data residual, which is often very challenging especially at very low frequency due to amplitude-tuning among different events and contamination from strong noise. To partly mitigate this problem, equation (11) is combined with a travel-time cost function that minimizes the time-shifts between input and modeled synthetic data in localized time windows.

Figure 18:
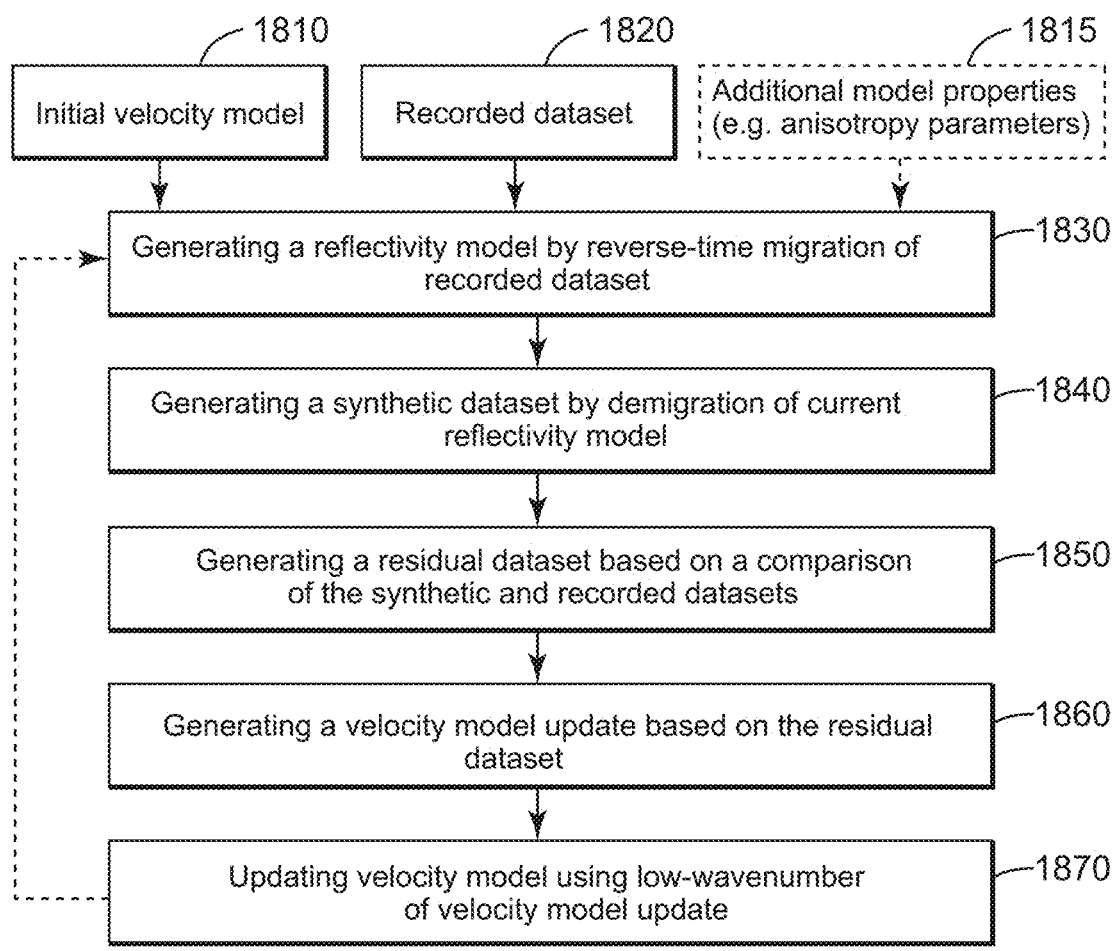
FIG. 18 is a workflow of an improved demigration-based FWI according to an embodiment.
Figure 19:
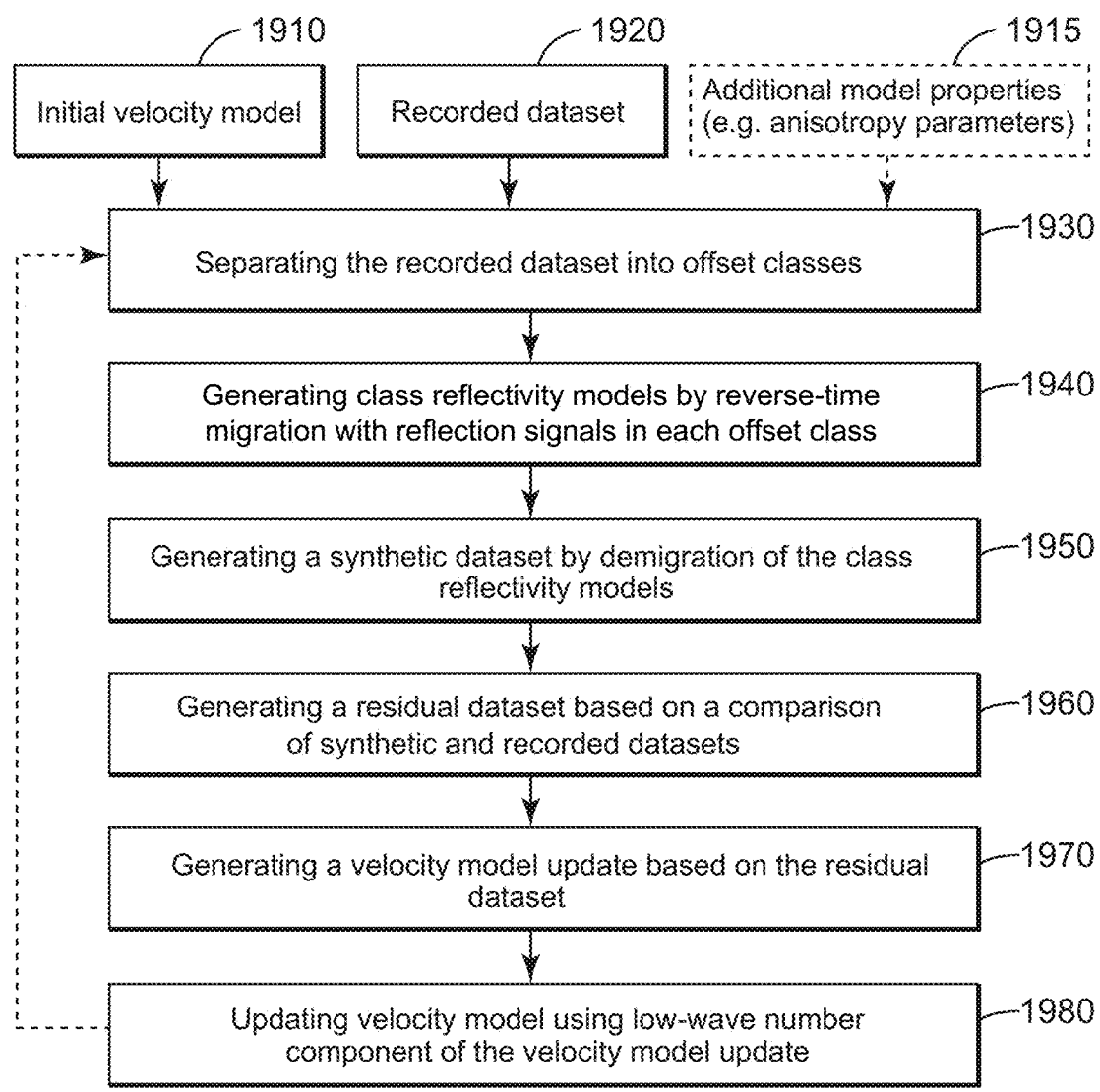
FIG. 19 is a workflow of another improved demigration-based FWI according to another embodiment.

FIGS. 18 and 19 are workflows of embodiments using the improved demigration-based FWI. Starting from an initial velocity model, recorded dataset and optionally additional model parameters such as anisotropy parameters, a reflectivity model is generated by reverse-time migration of the recorded dataset, at 1830. Then, at 1840, a synthetic dataset is generated by demigration of the reflectivity model. Further, at 1850, a residual dataset is generated based on a comparison of the recorded and synthetic datasets using a travel-time cost function. Here, the data-space cost function in equation (1) may also be used. A velocity model update is generated using the residual dataset at 1860, and then the velocity model is updated using the low-wavenumber component of the velocity update at 1870.

In FIG. 19, the recorded dataset is split into offset classes at 1930, and a class reflectivity model is generated for each offset class using a current velocity model at 1940. A synthetic dataset is generated at 1950 by demigrating the class reflectivity models, and a residual dataset is obtained at 1960 based on a comparison of the recorded and synthetic datasets. Step 1960 may use a travel-time based cost function. At 1970, a velocity model update is generated based on the residual dataset, the low component of which is then used to update velocity at 1980.

Errors in the velocity model introduce inaccuracy to the location of reflectors in the reflectivity model (migration image). Assuming the velocity is overall slow and thus the event is curving down on the common image point gather, and if the location of the event on the stack image is driven by near offsets, it may be shallower than the true location. Conversely, if the location of the event is mostly driven by far offsets, it can be deeper than the true location. When velocity errors are small and thus no cycle-skipping issue exists, the former may give a gradient with the correct sign while the latter gives a gradient with an opposite (wrong) sign. When velocity errors are large, the cycle-skipping issue may further complicate the situation. To mitigate the chance of an incorrect update sign, as well as the risk of cycle-skipping, the input data is split into a few offset classes, a reflectivity model being then generated for each offset class.

Figure 20A:
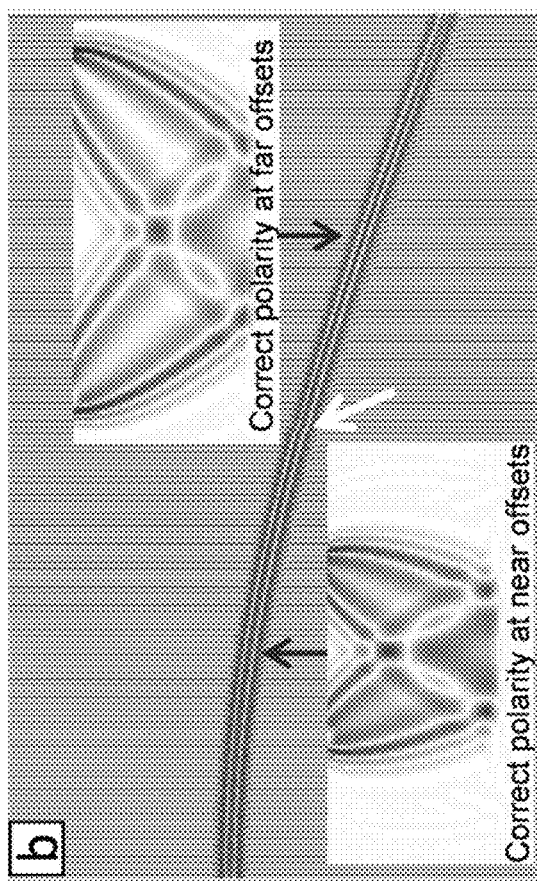
FIGS. 20A and 20B illustrate shot-domain data residual and gradient for sample traces at near and far offsets produced when a) one and b) two offset classes are used for reflectivity models during Born modeling to generate synthetic data.
Figure 20B:
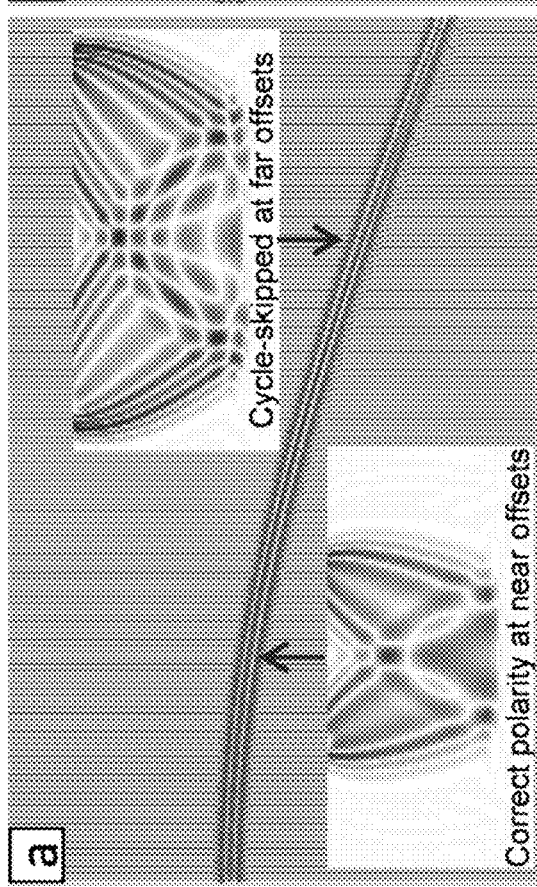

FIGS. 20A and 20B illustrate a simple 1D velocity and one reflector case where the reflector location in the reflectivity model is determined by near-offset data, which happens most of the time in the real world. In these figures, the background graphs are seismic traces, the wiggle in each trace corresponding to the reflector. These graphs' vertical axis is time in 0-12 s and horizontal axis is offset 0-10 km. The inserted graphs represent gradient as nuances of gray, with X-axis distance from 0-12 km and Y-axis depth from 0-4 km. Therefore, the synthetic data generated using the reflectivity model has timing consistent with near offsets and thus the gradient polarity is correct at near offsets (FIG. 20A). However, because the velocity here is too slow, the timing difference between input data and synthetic data is large at far offsets; therefore, the gradient has the opposite sign with oscillatory patterns at far offsets due to cycle-skipping. In FIG. 20B, the cycle-skipping issue observed in the right inset of FIG. 20A is corrected after the recorded dataset is split into two offset classes.

The improved demigration-based RFWI approach was applied to a staggered full-azimuth dataset from the GOM. The initial velocity model was obtained after several iterations of ray-based reflection tomography and diving-wave FWI for the overburden, followed by typical salt interpretation and subsalt velocity scans. Data pre-processing steps for RFWI included denoise, source and receiver deghosting, designature, surface-related multiple elimination, and shot-domain data regularization. The penetration depth for diving-wave energy for this dataset is about 6 km for a maximum offset of 18 km along the cable. In addition, the gather quality in the deep area is very poor for ray-based reflection tomography. Therefore, RFWI is required for deep targets at depths ranging from 6 to 10 km.

FIGS. 21A, 21B, 22A, 22B and 22C illustrate the benefit of the improved demigration-based RFWI over decomposition-based RFWI in terms of migration leakage. Regular RTM (as described, for example in the 1983 article "Reverse time migration by E. Baysal et al., published in *Geophysics* 48(11), pp. 1514-1524, which is incorporated herein by reference) was used to generate FIGS. 21A, 21B, 22A, 22B and 22C, regular. LSRTM (least squares RTM) may alternately be used. LSRTM is described, for example, in articles "Least-squares RTM: Reality and possibilities for subsalt imaging" published in 2016 SEG Technical Program Expanded Abstracts, pp. 4204-4209, and "Least-squares RTM: Theory and applications" by Wang et al., published in Fifteenth International Congress of the Brazilian Geophysical Society, pp. 1225-1229.

FIGS. 21A and 21B illustrate the velocity perturbation overlaid on the raw RTM stack after decomposition-based and demigration-based RFWI, respectively. Migration leakage is observed around the salt boundary, especially the salt flank, in FIG. 21A because those events involve strong energy with large wave-propagation angles in the source and receiver wavefields. In contrast, advantageously, the velocity perturbation obtained using demigration-based RFWI in FIG. 21B is free from such leakage.

FIGS. 22A, 22B and 22C are sections (a 5-10 km depth range and a 10 km horizontal range) of initial, decomposition-based RFWI and demigration-based RFWI velocity models. Decomposition-based RFWI yields a slightly improved model in FIG. 22B relative to the initial model in FIG. 22A, while demigration-based RFWI yields a significantly better results in FIG. 22C at least in the encircled area.

Further, FIG. 23A represents an inline vertical slice (left) and a cross-line vertical slice obtained using the initial model, and FIG. 23B shows the corresponding inline and crossline sections ontained with the velocity model resulting from the improved demigration-based RFWI. Compared to those from the initial model, advantageously, the demigration-based RFWI results have much better focusing and event continuity in the subsalt area.

An RFWI workflow that adopts Born modeling to explicitly generate the tomographic term is free from migration contamination. Furthermore, a set of partial stacks may be used as reflectivity models for Born modeling to reduce possible cycle-skipping as well as incorrect update sign issues and a travel-time cost function to mitigate the negative impact of amplitude mismatch between input data and modeled synthetic data. The real dataset tests have shown that the improved demigration-based RFWI approach yields a sharper image for deep targets where diving-wave FWI and ray-based reflection tomography are insufficient.

Notably, the velocity update from this improved demigration-based RFWI has low resolution, especially in the vertical direction, because 1) the update is driven by reflection data with the transmission image condition and thus is intrinsically in low wavenumbers; 2) the update is mostly dominated by a few strong events; and 3) the angle range of the deep reflection data is limited. The resolution of RFWI processing may be improved by better addressing these limitations.

All the methods described in this section II may be performed using a seismic data processing apparatus including an interface and a data processing unit as described later and exemplarily illustrated in FIG. 35. These methods may also be embodied into computer executable codes non-transitorily stored on a computer-readable recording medium.

III. Improving Reflection FWI Reflectivity Using Single-Iteration Least-Square RTM The quantitative estimation of the reflectivity in RFWI may also be improved. This is a significant step of the inversion process, since it not only affects the generation of the synthetic reflection data, but also the generation of the tomographic term of the gradient (i.e., the "rabbit ears" in the gradient graph) along the reflection wavepaths. The quantitative estimation of the reflectivity may be performed using least-squares RTM (LSRTM). In one embodiment, LSRTM is implemented by estimating the Hessian matrix and its inverse in the curvelet-domain. However, other implementations are possible.

RFWI, as exemplarily described in U.S. Patent Publication Number 2013/0238249 (incorporated herewith by reference in its entirety), has recently regained traction as a promising technique to retrieve low-wavenumber updates of the velocity model using reflection data. Despite being presented in different forms, RFWI typically assumes the model m can be separated into a long-wavelength (or background) component $m_0$ and a short-wavelength (or perturbation) component $\delta m$, i.e., $m = m_0 + \delta m$.

RFWI aims to update the background model $m_0$ so as to minimize the difference between the observed and synthetic reflection data. In general, this is achieved by iterating over the following steps:
1. Estimate the short-wavelength part of the model, or "model perturbation" $\delta m$, using the current background model $m_0$.
2. Generate synthetic reflection data using $m_0$ and $\delta m$.
3. Measure a residual between the input and synthetic reflection data.
4. Back-propagate the residual into the current model to obtain the velocity update along the reflection wavepaths, the so-called rabbit ears.

The first step of this process, estimating $\delta m$, not only affects the generation of the synthetic reflection data, but also the generation of the rabbit ears along the reflection wavepaths. Different manners of using this short-wavelength component in RFWI have recently been proposed. For example, $\delta m$ may be used to update the density model, the impedance model or adding (and later removing) the short-wavelength component directly into the velocity model.

Alternatively, $\delta m$ can be introduced as a reflectivity model (as for example described in the above-mentioned US Patent Publication), in which case demigration has to be used to model the synthetic reflection data. One of the advantages of this approach is that it facilitates the separation between the high-wavenumber and low-wavenumber components of the FWI gradient. In this scenario, the first step effectively becomes a least-squares reverse time migration (LSRTM) problem, i.e., $$\delta m = (L^T L)^{-1} L^T d \qquad (11)$$

where L represents the Born modeling operator, $L^T$ represents its adjoint, the migration operator, and d represents the recorded data. Equation 11 can be solved iteratively using local optimization methods such as steepest-descent or conjugate gradient. However, in the RFWI context, due to the computational cost involved, the LSRTM in the first step is normally reduced to a simple RTM, i.e., $\delta m \approx L^T d$, with the Hessian matrix $(L^T L)^{-1}$ sometimes being replaced with diagonal approximations.

Ignoring the effect of the Hessian matrix in Equation 11 exposes the RFWI reflectivity $\delta m$ to limitations of the migration operator and the acquisition geometry, which consequently affects the amplitude of the synthetic data $L\delta m$, as well as the balance between the contribution from different rabbit ears. To address these issues, previous approaches rely on schemes such as data matching and automatic gain control or to using kinematic-based objective functions that naturally include amplitude normalization terms. However, these methods can be prone to over-boosting weak noise and either arbitrarily address (e.g., by automatic gain control) or do not address the issues of $\delta m$ that is later used to generate the rabbit ears.

Hereinafter, the effects of relying on RTM instead of LSRTM to calculate the RFWI reflectivity are investigated using a synthetic dataset. In addition, using a single-iteration LSRTM, more specifically, using curvelet-domain Hessian filters (CHF) is proposed and validated with field data results as a more efficient approach.

Figure 24A:
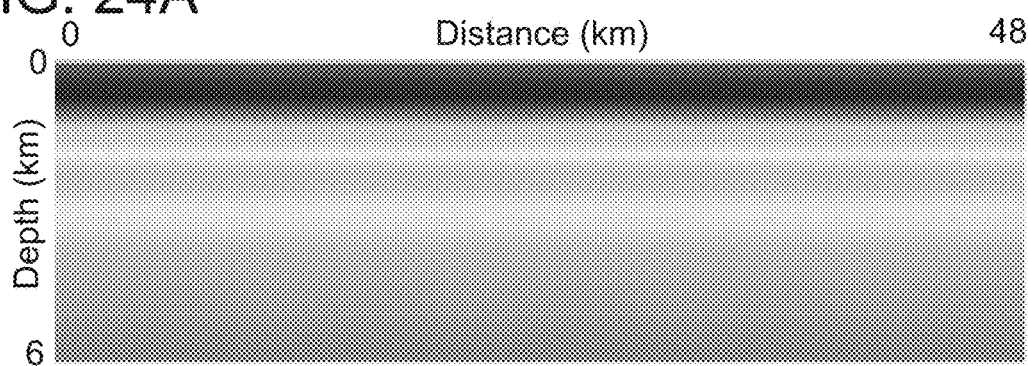
FIGS. 24A and 24B represent vertical slices of velocity and density models used to generate synthetic data employed to illustrate the effect of performing LSRTM for the RFWI reflectivity calculation.
Figure 24B:
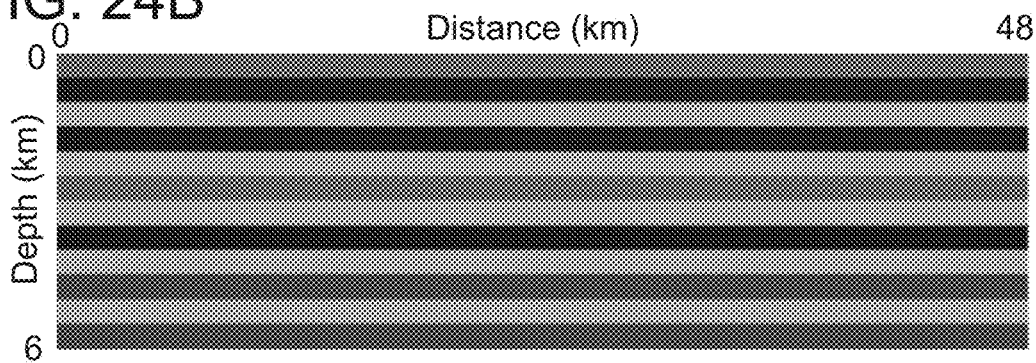

FIGS. 24A and 24B are vertical slices of models used to generate synthetic data for illustrating the effect of performing LSRTM for the RFWI reflectivity calculation. FIG. 24A is a velocity model and FIG. 24B is a density model formed by a series of parallel layers.

Figure 25A:
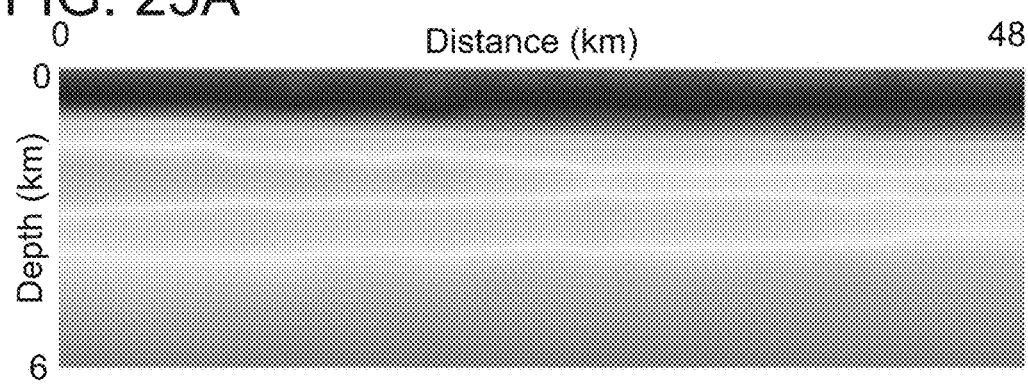
FIGS. 25A and 25B are vertical slices of an initial velocity model and its error used for RFWI.
Figure 25B:
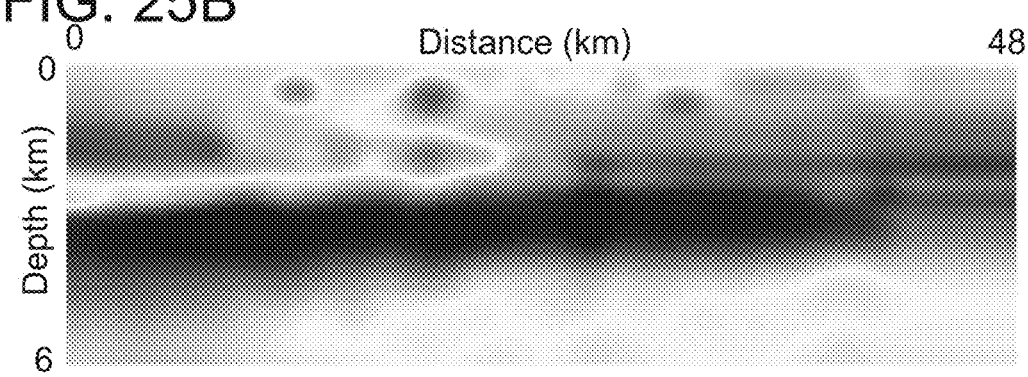

A ghost-free data set with maximum offset of 8 km was then generated using forward modeling. The initial model used for RFWI is the 1D model shown in FIG. 25A, and its velocity error correspondent is shown in FIG. 25B. The main challenge for RFWI in this case is to retrieve the low velocity zone below 3 km, which is beyond the diving wave penetration depth for the offsets available.

The RFWI results using RTM and LSRTM to calculate the reflectivity model were compared. In the RTM case, an amplitude match between synthetic data L$\delta$m and input data d was done prior to the residual calculation, to minimize the error produced by ignoring the Hessian matrix. In addition, a diagonal approximation of the Hessian was applied to compensate for the source-side illumination. However, in the LSRTM case, those steps were not necessary since the LSRTM itself compensates the Hessian effects and produce more accurate amplitudes.

Figure 26A:
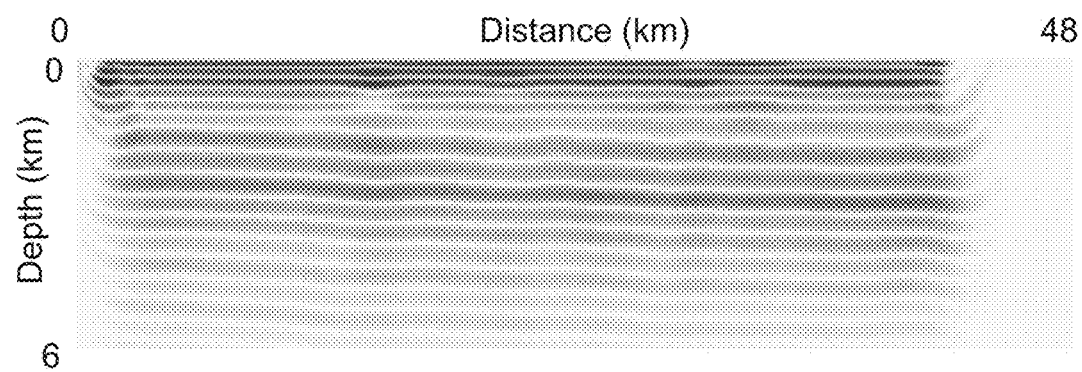
FIGS. 26A and 26B are vertical slices of the reflectivity models obtained (a) in the first RFWI iteration, using RTM and (b) LSRTM, respectively.
Figure 26B:
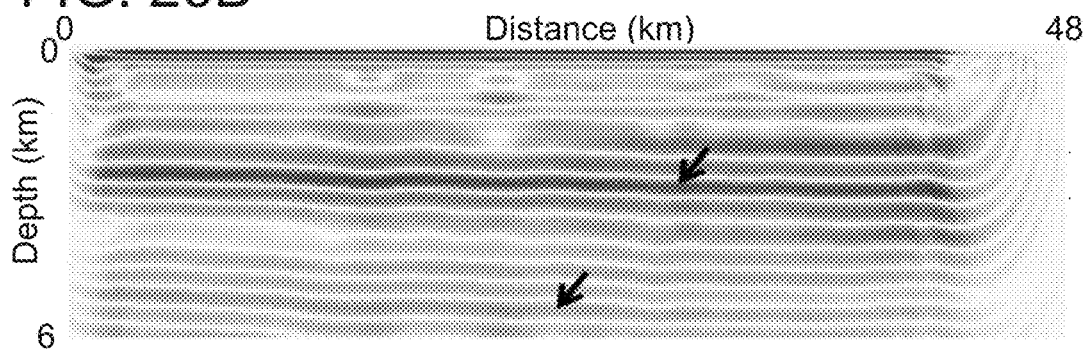

FIGS. 26A and 26B are vertical slices of the reflectivity models obtained (a) in the first RFWI iteration, using RTM and (b) LSRTM, respectively, as described above. The maximum frequency in this case was 3 Hz. Although the diagonal approximation applied to the RTM produced relatively balanced amplitudes in FIG. 26A, it still does not fully compensate for the Hessian effects, as can be noted by comparing it to the LSRTM result in FIG. 26B.

The RFWI was then applied starting from the initial model shown in FIG. 24A and a fixed constant density model. The transmitted wave data were muted prior to the inversion. A total of 35 RFWI iterations were performed from 3 Hz to 6 Hz, with each iteration requiring the recalculation of $\delta$m using the current background model.

Figure 27A:
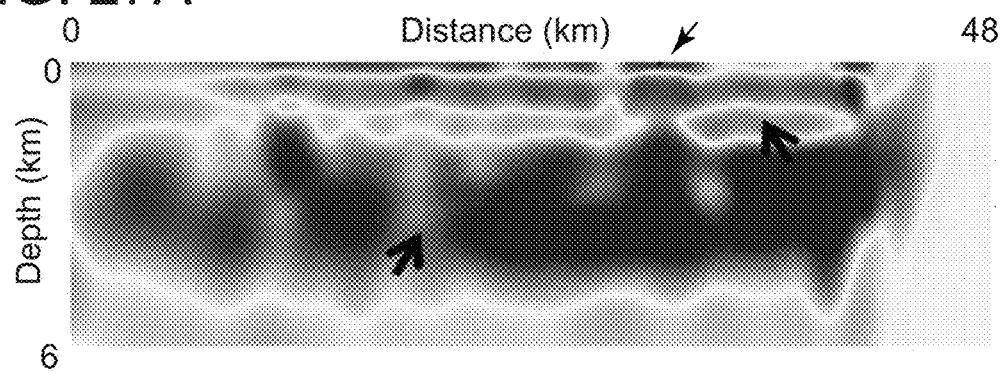
FIGS. 27A and 27B show the RFWI result using RTM and LSRTM, respectively, to calculate the reflectivity model at each iteration.
Figure 27B:
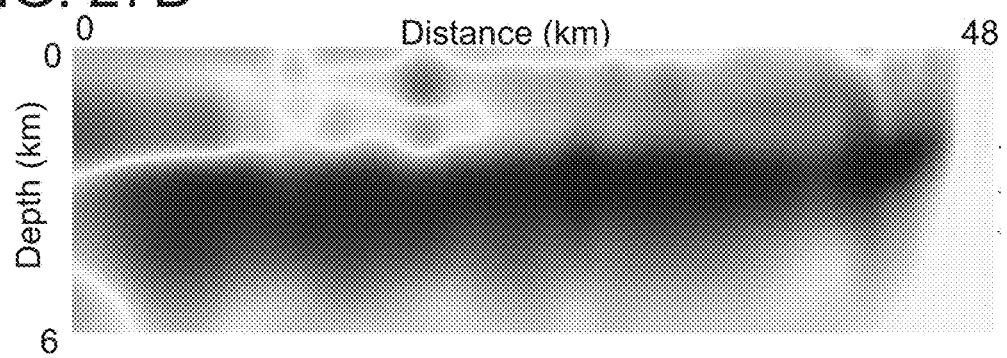

FIGS. 27A and 27B show the RFWI result using RTM and LSRTM, respectively, to calculate the reflectivity model at each iteration. A comparison with the true velocity error (FIG. 25B) reveals that the LSRTM-based RFWI result (FIG. 27B) is able to invert the main features of the model, with the perturbation distribution resembling the true result. In contrast, the RTM-based RFWI (FIG. 27A) suffers from localized artifacts, as indicated by the arrows, resulting from the accumulated effects of neglecting the Hessian matrix.

The results in FIGS. 27A and 27B show the benefits of using a more accurate method to calculate the RFWI reflectivity model. Nevertheless, the cost of doing a LSRTM at every iteration cannot be overlooked for large 3D data sets. Therefore, a more efficient compromise had to be considered for realistic applications.

One way to improve the RFWI reflectivity model without dramatically increasing its cost is by using so-called single-iteration LSRTM methods, which aim to fully compensate for the Hessian effects while requiring at most two migrations. Many different approaches have been proposed to achieve this goal, e.g., the approximate inverse Born modeling operator, point-spread function deconvolution, and non-linear Hessian filters.

One approach is to compute the non-linear Hessian filters in the curvelet domain by minimizing the objective function $f$:

$$f(s) = \|C[L^T d] - sC[(L^T L)L^T d]\|^2 + \epsilon \|s\|^2 \qquad (12)$$

where s represents the curvelet-domain Hessian filters (CHF), C represents the curvelet transform, and E is a weight factor for the normalization term. In the context of RFWI, the reflectivity can then be determined by:

$$\delta m \approx C^{-1}[|s|C[L^T d]] \qquad (13)$$

where $C^{-1}$ denotes the inverse curvelet transform. This approach has been shown to compensate for the Hessian effects while preventing the boosting of noise in poor signal-to-noise areas of the reflectivity, due to the sparseness introduced by the curvelet transform.

Equation 13 can be used to calculate the RFWI reflectivity instead of the costly iterative LSRTM. Compensating for the Hessian effects by using curvelet-domain filters brings some additional advantages to RFWI when compared to the iterative LSRTM.

First, assuming the Hessian matrix does not significantly change between iterations, the computational cost may be dramatically decreased by reusing filters computed in previous iterations.

In this case, the cost of calculating the reflectivity after the first RFWI iteration is reduced to a single migration and the negligible cost of applying the filters. In contrast, the iterative LSRTM would have to be performed from the first iteration, using the updated velocity model, resulting in a total cost of several migrations for the reflectivity estimation. On the other hand, the curvelet-domain Hessian filters can be recalculated only after a certain number of iterations, to account for accumulated changes in the velocity model.

Another part of the RFWI process that could benefit from the reusability of the curvelet-domain Hessian filters is the step-length calculation, which determines how much the objective function gradient should be scaled before the velocity update. One typical way to achieve that is by using a method in which the step-length is determined by:

$$\alpha = \beta \frac{[L(m_0 + \beta \delta m_0, \delta m) - L(m_0, \delta m)]^T [d - L(m_0, \delta m)]}{[L(m_0 + \beta \delta m_0, \delta m) - L(m_0, \delta m)]^T [L(m_0 + \beta \delta m_0, \delta m) - L(m_0, \delta m)]} \qquad (14)$$

where $\alpha$ is the step-length, $\delta m_0$ represents the background velocity update and $\beta$ is a small constant to introduce a small perturbation in the velocity model.

Solving equation 14 requires calculating an additional synthetic data $L(m_0 + \beta \delta m_0, \delta m)$. However, in RFWI, since the background model is changed by $\beta \delta m_0$, the previously calculated reflectivity model $\delta m$ is no longer consistent with the background velocity anymore, which could result in an underestimation of the step-length and, consequently, slower convergence.

Therefore, the reflectivity model should be recalculated using the perturbed background model $m_0 + \beta \delta m_0$, in order to obtain an optimal step-length. If iterative LSRTM is used, several migrations are required to estimate the correspondent reflectivity model. However, since the perturbation in the model ($\beta \delta m_0$) is relatively small, the curvelet-domain Hessian filters calculated during the first estimation of $\delta m$ can be safely reused during the step-length calculation, resulting in a significant cost-reduction for this step.

This method has then been applied to a field data example. The data used for this test is from a deep-water survey in the GoM. The seismic data were acquired using a flat-cable wide-azimuth (WAZ) acquisition configuration with maximum offset of 8.1 km along the cables and 4.2 km across the cables.

Evaluation of the improved reflectivity model in the synthetic reflection data generated during RFWI is illustrated with graphs in FIGS. 28A, 28B and 28C which are slices of reflectivity and of synthetic reflection datasets obtained by demigration. FIGS. 28A, 28B and 28C represent the 4 Hz reflectivity obtained with RTM, iterative LSRTM, and single-iteration LSRTM for the first RFWI iteration, respectively. FIGS. 28D, 28E and 28F show the synthetic reflection datasets obtained by demigration using the respective reflectivity models. One notices that later arrivals have improved signal-to-noise ratio in FIGS. 28E and 28F, result of the improved amplitudes of deep reflectors observed in FIGS. 28B and 28C. One also observes that the single-iteration LSRTM is able to achieve a comparable result at a fraction of the iterative LSRTM cost.

Then, ten iterations of RFWI using a maximum frequency of 4 Hz have been performed. As reference, the migrated image using the initial model is presented in FIG. 29A, which shows strong discontinuity of the deep events due to velocity errors in the overburden. FIG. 29B shows the same section migrated with the final RFWI model using RTM to obtain the reflectivity model. Although improvements can be observed in many locations, there are still some discontinuities as indicated by the arrows. Finally, FIG. 29C shows the image migrated with the RFWI model using single-iteration LSRTM for reflectivity. It is visible that the improved reflectivity model had a positive impact on the inverted velocities, resulting in more focused and continuous events.

Although compensating for the Hessian effects in the RFWI reflectivity model has clear benefits, there are still limitations. One limitation is cause by the single-iteration LSRTM methods normally relying on a windowed matching process, assuming a smooth transition of the illumination problem, which is not always the case. One possible approach to overcome this issue is to use the matching filters to pre-condition the iterative LSRTM, thus speeding up its convergence.

Another issue concerns the least-squares migration in general, including iterative methods, which are limited by effects that are not taken into account, such as transmission loss, attenuation, and mode conversion.

Finally, having the correct amplitudes in the reflectivity model does not automatically prevent stronger events from contributing more in the RFWI inversion, since they still generate stronger reflection energy, which result in stronger rabbit ears. However, the single-iteration LSRTM reflectivity can be naturally combined with kinematic-based objective functions (such as travel-time based cost functions discussed in subsection I), which normalize the contribution from different events in the velocity update stage. These objective functions also benefit from the improved reflectivity and synthetic data, as indicated in FIGS. 28A and 28B.

The synthetic and field data results show the importance of compensating for the Hessian matrix effect in RFWI, i.e., using LSRTM instead of RTM for the calculation of its reflectivity. However, the cost of doing so cannot be overlooked for large 3D data sets. Therefore, it is a more efficient approach using single-iteration LSRTM, more specifically, using curvelet-domain Hessian filters. Despite some limitations, this approach significantly improves the RFWI results when compared to using RTM to calculate the reflectivity. Some of the above-discussed limitations may be mitigated by using kinematic-based objective functions.

FIGS. 30-33 illustrate embodiments of reflection FWI reflectivity using single-iteration LSRTM. All these embodiments start from the same inputs: an initial velocity model and the recorded dataset. Optionally additional model properties such as (but not limited to) anisotropy parameters may also be input.

Figure 30:
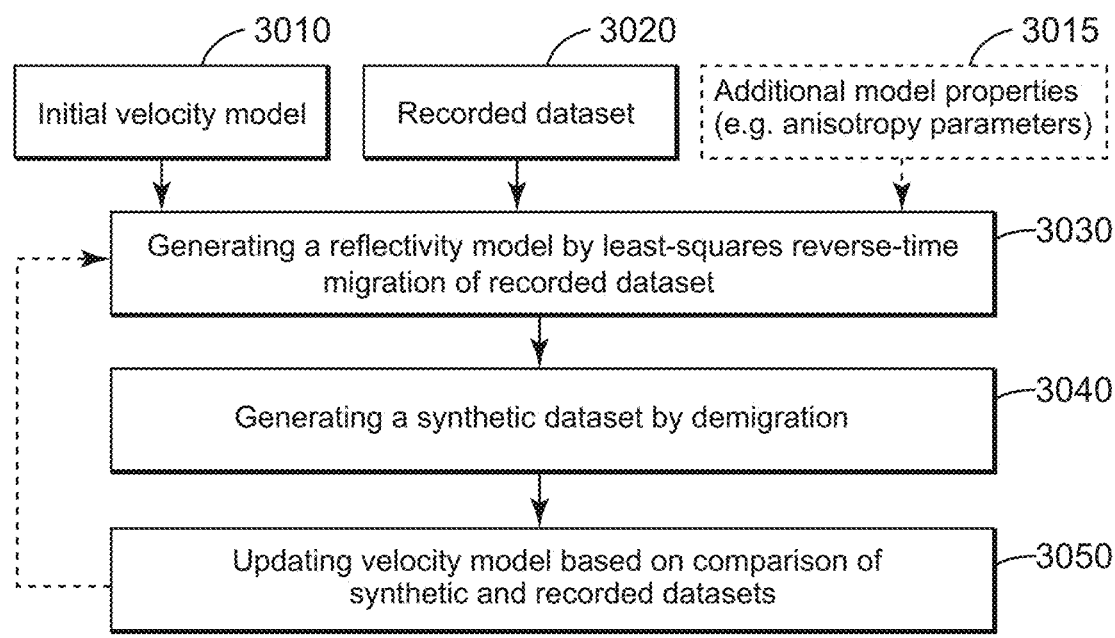
FIG. 30 is a workflow of a RFWI reflectivity using single-iteration LSRTM according to an embodiment.

In FIG. 30, using the initial velocity model, a reflectivity model is generated by applying LSRTM to the recorded dataset at 3030, and then a synthetic dataset is generated by demigration at 3040. The velocity model is updated at 3050 based on a comparison of the synthetic and recorded datasets. Steps 3030-3050 may be repeated using the updated velocity model obtained at a previous execution of 3050 instead of the initial velocity model. A predetermined number of repetitions may be performed and/or repeating steps 3030-3050 may be stopped once a convergence criterion is met.

Figure 31:
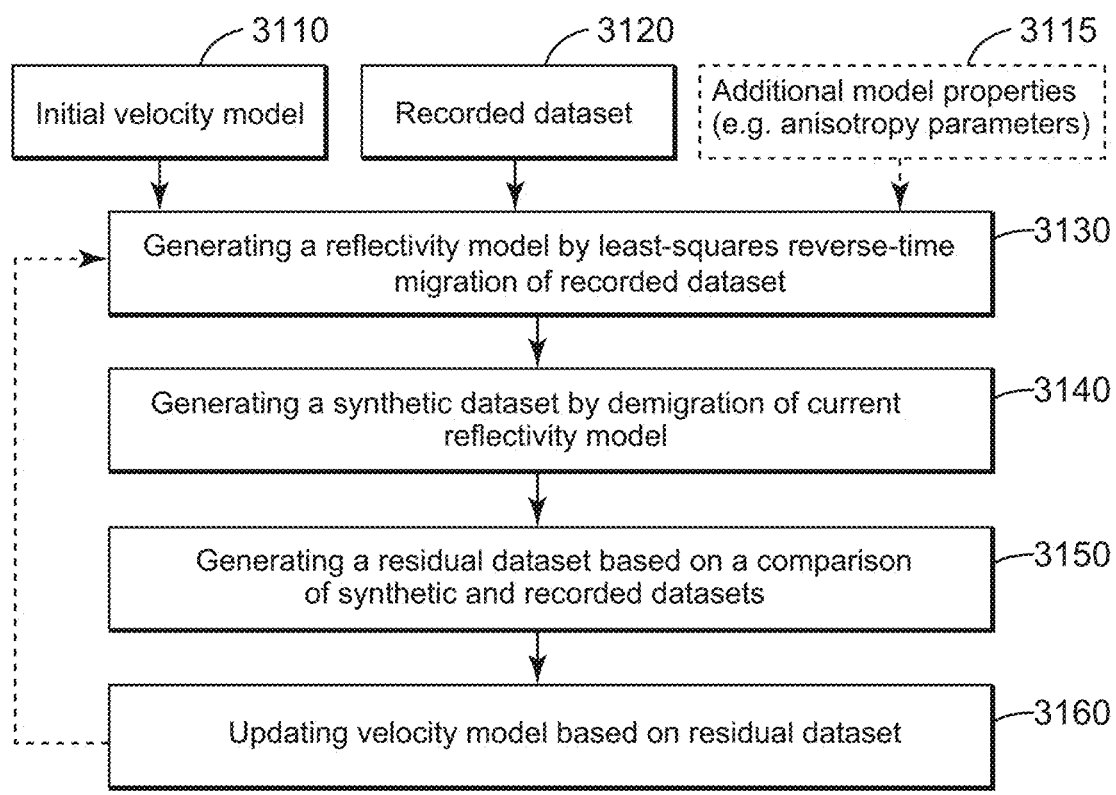
FIG. 31 is a workflow of a RFWI reflectivity using single-iteration LSRTM according to another embodiment.

The embodiment in FIG. 31 similarly uses the initial velocity model, to generated reflectivity model by applying LSRTM to the recorded dataset at 3130, and then a synthetic dataset by demigration of the current reflectivity model at 3140. A residual dataset is then generated at 3150 based on a comparison of the synthetic and recorded datasets. The velocity model is updated at 3160 based on the residual dataset. Steps 3130-3160 may be repeated using the updated velocity model obtained at a previous execution of 3160 instead of the initial velocity model. A predetermined number of iterations may be performed and/or repeating steps 3130-3160 may be stopped once a convergence criterion is met.

Figure 32:
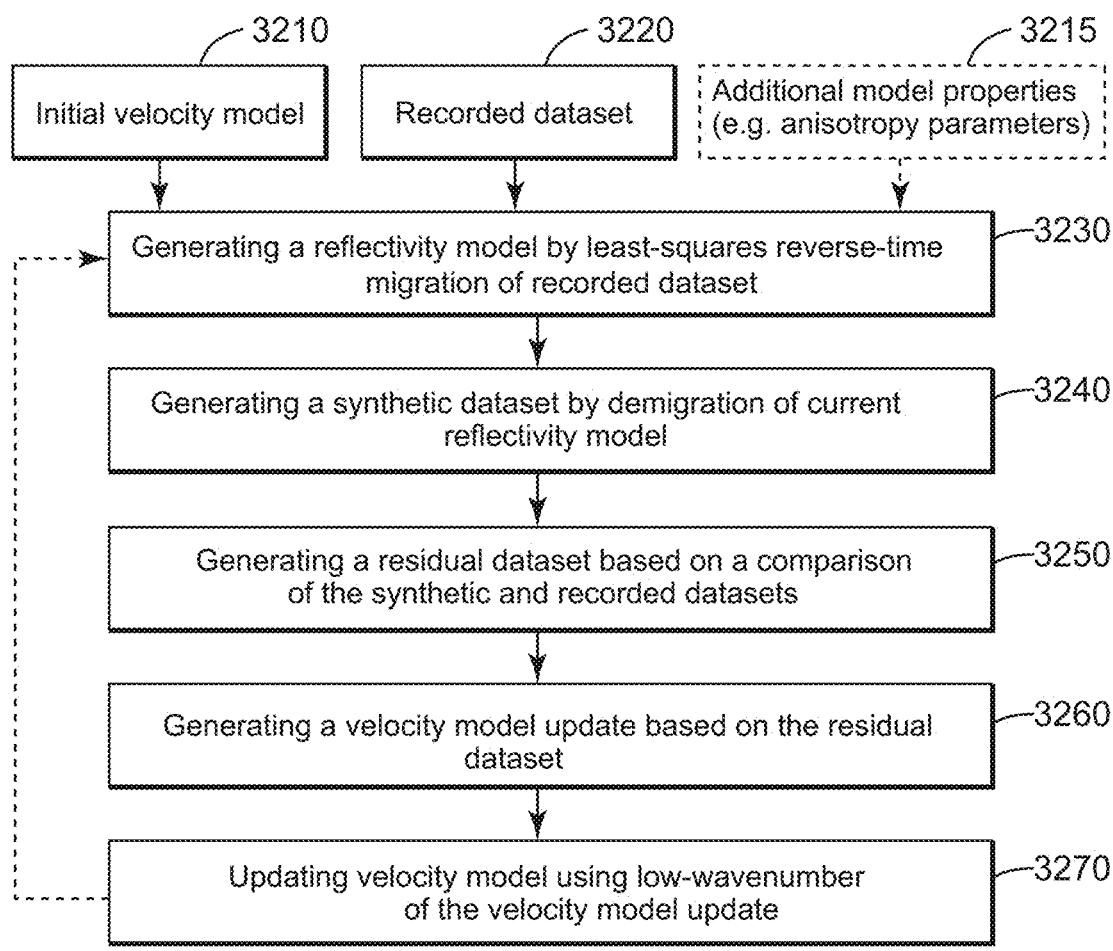
FIG. 32 is a workflow of a RFWI reflectivity using single-iteration LSRTM according to yet another embodiment.

Steps 3230-3250 of the embodiment in FIG. 32 are the same as steps 3130-3150 of the embodiment in FIG. 31. At 3260 a velocity model update is generated based on the residual dataset. This embodiment further performs, at 3270, further updating the velocity model using a low number component of the velocity update generated at step 3260. Steps 3230-3270 may be repeated using the updated velocity model obtained at a previous execution of 3270 instead of the initial velocity model, for a predetermined number times and/or until a convergence criterion is met.

Figure 33:
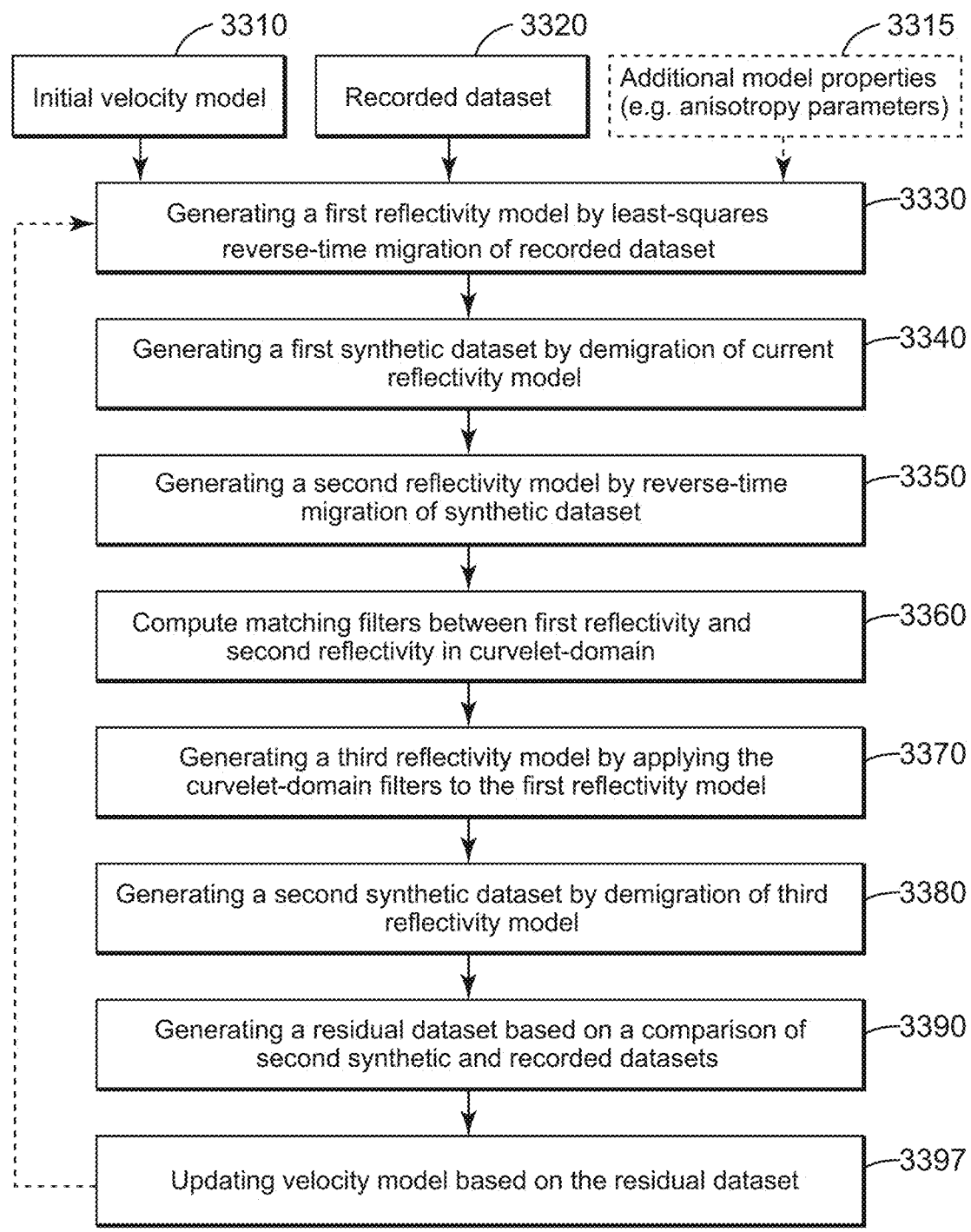
FIG. 33 is a workflow of a RFWI reflectivity using single-iteration LSRTM according to another embodiment.

FIG. 33 is a workflow of a RFWI reflectivity using single-iteration LSRTM according to another embodiment. At 3330, a first reflectivity model is generated by reverse-time migration of the recorded dataset, and at 3340, a first synthetic dataset is generated by demigration of the current reflectivity model. Then, at 3350, a second reflectivity model is generated by reverse-time migration of the first synthetic dataset. Further, at 3360, matching filters between the first reflectivity model and the second reflectivity model are computed in the curvelet domain. A third reflectivity model is generated by applying the curvelet-domain filters to the first reflectivity model at 3370.

Then, at 3370, a second synthetic dataset is generated by demigration of the third reflectivity model at 3380, and, a residual dataset is obtained at 3390 based on a comparison of the second synthetic and recorded datasets. Finally, at 3397, the velocity model is updated based on the residual dataset. Steps 3330-3397 may be repeated using the updated velocity model obtained at a prior execution of step 3397 instead of the initial velocity model, for a predetermined number times and/or until a convergence criterion is met.

Figure 34:
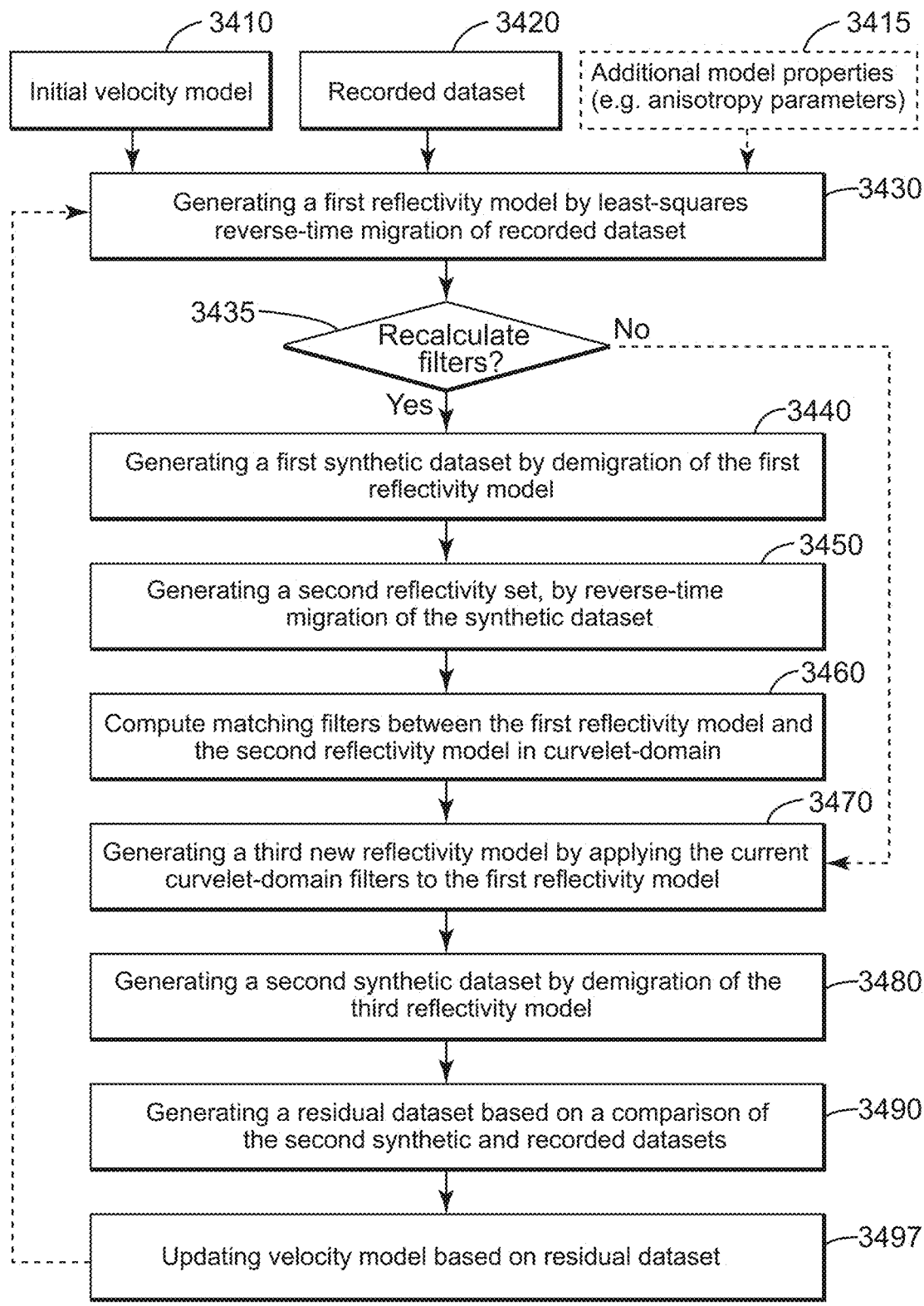
FIG. 34 is a workflow of a RFWI reflectivity using single-iteration LSRTM according to another embodiment.

FIG. 34 is a workflow of a RFWI reflectivity using single-iteration LSRTM according to yet another embodiment. Steps 3430-3497 are essentially same as steps 3330-3397. However, in this embodiment, whether the curvelet-domain filters have to be recalculated is assessed at 3435. In one embodiment the filters are calculated only once at a predetermined number of repetitions of steps 3430-3497. In another embodiment, whether the curvelet-domain filters have to be recalculated depends on difference between the velocity models obtained in previous iterations. Here, the decision could be based on an arbitrary number of iterations (e.g., to recalculate every 5 iterations) or based on the accumulated velocity change (e.g., to recalculate if accumulated difference is larger than 100 m/s at some location).

Figure 35:
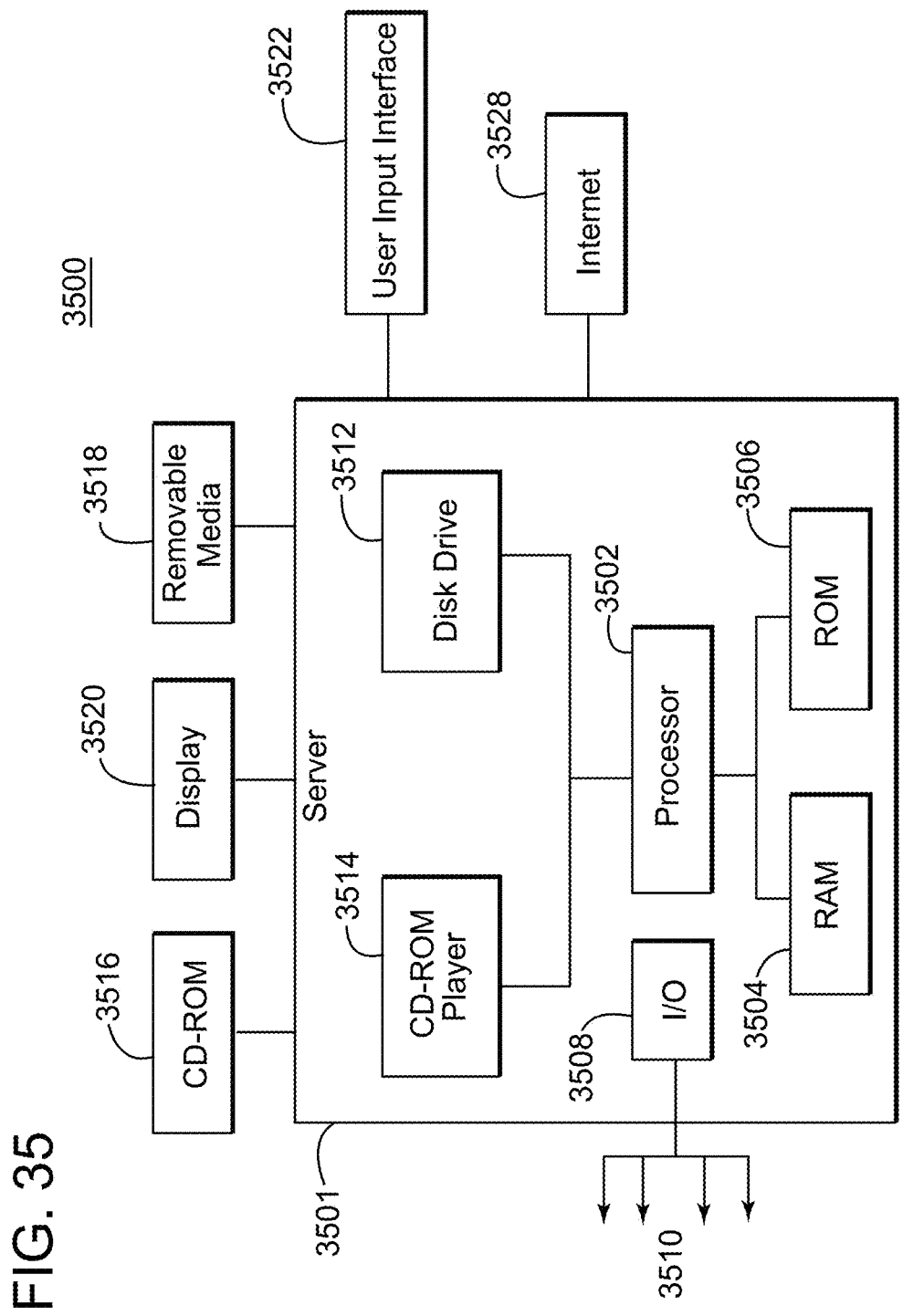
FIG. 35 is a schematic representation of a seismic data processing apparatus according to an embodiment.

FIG. 35 illustrates a seismic data processing apparatus 3500 configured to execute seismic exploration methods such as the ones described in sub-sections I, II and III.

Apparatus 3500 includes a server 3501 which has a central processor (CPU) and/or a graphics processor (GPU) 3502 coupled to a random-access memory (RAM) 3504 and to a read-only memory (ROM) 3506. ROM 3506 may also be other types of storage media to store programs, such as programmable ROM (PROM), erasable PROM (EPROM), etc. Processor 3502 may communicate with other internal and external components through input/output (I/O) circuitry 3508 and bussing 3510 to provide control signals and the like. Processor 3502 carries out a variety of functions as are known in the art, as dictated by software and/or firmware instructions.

RAM 3504 is one type of non-transitory computer-readable recording medium that stores executable codes which, when executed by a processor, make the computer perform a method (600) for seismic exploration described in the above sub-sections.

Interface 3522 is configured to obtain recorded data (i.e., acquired during a seismic survey), an initial velocity model and optionally additional model parameters for an explored subsurface formation. For example, referring back to FIG. 4, CPU 3502 is configured to generate a synthetic dataset based on the initial velocity model, to measure time-shifts between the synthetic data and the recorded data such as to achieve a maximum cross-correlation there-between in frequency dependent time windows, and to update the velocity model using a travel-time cost function.

CPU 3502 may calculate respective lengths of at least some among the frequency-dependent windows are calculated as L=k/f, where L is the window length in seconds, k is a user input parameter between 2 and 5, and f is frequency in Hertz.

Alternatively or additionally, CPU 3502 may be configured to calculate weights, which are cross-correlation coefficients between the recorded data shifted according to the time-shifts, and the synthetic data, the weights being then used for calculating the cost function. In one embodiment the weights are calculated using formula (4). The cost function may be calculated as a sum of squared time-shifts multiplied by the weights.

Server 3501 may also include one or more data storage devices, including hard drives 3512, CD-ROM drives 3514 and other hardware capable of reading and/or storing information, such as DVD, etc. In one embodiment, software for carrying out the above-discussed steps may be stored and distributed on a CD-ROM or DVD 3516, a USB storage device 3518 or other form of media capable of portably storing information. These storage media may be inserted into, and read by, devices such as CD-ROM drive 3514, disk drive 3512, etc. Server 3501 may be coupled to a display 3520, which may be any type of known display or presentation screen, such as LCD, plasma display, cathode ray tube (CRT), etc. A user input interface 3522 is provided, including one or more user interface mechanisms such as a mouse, keyboard, microphone, touchpad, touch screen, voice-recognition system, etc.

Server 3501 may be coupled to other devices, such as sources, seismic sensors, etc. The server may be part of a larger network configuration as in a global area network (GAN) such as the Internet 3528, which allows ultimate connection to various landline and/or mobile computing devices.

The disclosed embodiments provide methods and devices for seismic exploration using improved RFWI methods. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic exploration using a full waveform inversion, FWI, the method comprising:
   obtaining an initial velocity model and recorded data for a surveyed subsurface formation;
   generating synthetic data based on the initial velocity model;
   determining time-shifts between the synthetic data and the recorded data so as to achieve a maximum cross-correlation in frequency dependent time windows; and
   updating the velocity model using FWI with a cost function based on the time-shifts, wherein the updated velocity model is used to obtain an image of the surveyed subsurface formation usable to locate natural resources.

2. The method of claim 1, wherein lengths of at least some among the frequency-dependent time windows are calculated as $$L = \frac{k}{f}$$

where L is a window length in seconds, k is a user input parameter between 2 and 5, and f is frequency in Hertz.

3. The method of claim 1, wherein additional model properties for the surveyed subsurface formation are also obtained and used for generating the synthetic dataset.

4. The method of claim 1, further comprising
   calculating weights which are cross-correlation coefficients between the recorded data shifted according to the time-shifts, and the synthetic data, the weights being used for calculating the cost function.

5. The method of claim 4, wherein the weights are calculated using following formula $$c(\Delta\tau) = \frac{\int_{t_1}^{t_2} d(t+\Delta\tau)u(t)dt}{\sqrt{\int_{t_1}^{t_2} d(t+\Delta\tau)d(t+\Delta\tau)dt}\sqrt{\int_{t_1}^{t_2} u(t)u(t)dt}}$$

where u is the synthetic data, d is the recorded data, and ΔT is a respective time-shift.

6. The method of claim 4, wherein the cost function is a sum of squared time-shifts multiplied by the weights, respectively.

7. The method of claim 1, wherein the updating includes generating an adjoint source dataset using the cost function, and
calculating gradient of the adjoint source dataset.

8. The method of claim 1, wherein the generating of the synthetic data is repeated using the updated velocity model instead of initial velocity model, followed by the determining of the time-shifts and the updating of the velocity model.

9. The method of claim 8, wherein the generating of the synthetic data is using the updated velocity model instead of initial velocity model, the determining of the time-shifts and the updating of the velocity model are repeated until a predetermined condition is met.

10. A seismic processing apparatus for seismic exploration using a travel-time full waveform inversion, FWI, the apparatus comprising:
an interface configured to obtain an initial velocity model and recorded data for a surveyed subsurface formation; and
a data processing unit connected to the interface and configured
to generate synthetic data based on the initial velocity model,
to determine time-shifts between the synthetic data and the recorded data so as to achieve a maximum cross-correlation there-between in frequency-dependent time windows, and
to update the velocity model using FWI with a cost function based on the time-shifts,
wherein the updated velocity model is used to obtain an image of the surveyed subsurface formation usable to locate natural resources.

11. The seismic processing apparatus of claim 10, wherein the data processing unit calculates lengths of at least some among the frequency-dependent time windows as $$L = \frac{k}{f}$$

where L is a window length in seconds, k is a user input parameter between 2 and 5, and f is frequency in Hertz.

12. The seismic processing apparatus of claim 10, wherein the interface also obtains additional model properties for the surveyed subsurface formation, and the data processing unit uses the additional model properties for generating the synthetic dataset.

13. The seismic processing apparatus of claim 10, wherein the data processing unit is further configured
to calculate weights which are cross-correlation coefficients between the recorded data shifted according to the time-shifts, and the synthetic data, and
to use the weights for calculating the cost function.

14. The seismic processing apparatus of claim 13, wherein the weights are calculated using following formula $$c(\Delta \tau) = \frac{\int_{t_1}^{t_2} d(t + \Delta \tau) u(t) dt}{\sqrt{\int_{t_1}^{t_2} d(t + \Delta \tau) d(t + \Delta \tau) dt} \sqrt{\int_{t_1}^{t_2} u(t) u(t) dt}}$$

where u is the synthetic data, d is the recorded data, and $\Delta T$ is a respective time-shift.

15. The seismic processing apparatus of claim 13, wherein the cost function is a sum of squared time-shifts multiplied by the weights, respectively.

16. The seismic processing apparatus of claim 10, wherein, when updating the velocity model, the data processing unit generates an adjoint source dataset using the cost function, and calculates gradient of the adjoint source dataset.

17. The seismic processing apparatus of claim 10, wherein the data processing unit repeats generating the synthetic data using the updated velocity model instead of initial velocity model, and then determines the time-shifts and updates again the velocity model.

18. The seismic processing apparatus of claim 17, wherein the data processing unit repeats generating of the synthetic data using the updated velocity model instead of initial velocity model, determining of the time-shifts and updating the velocity model until a predetermined condition is met.

19. A method for seismic exploration using a demigration-based full waveform inversion, FWI, the method comprising:
obtaining an initial velocity model and a recorded dataset acquired over an explored subsurface formation, wherein initially a current velocity model is the initial velocity model;
separating the recorded dataset into offset classes;
until a predetermined condition is met
generating class reflectivity models by reverse-time migration for each offset class using a current velocity model, and a synthetic dataset by demigration of the class reflectivity models;
generating a residual dataset based on a comparison of the synthetic and the recorded datasets;
generating a velocity model update based on the residual dataset; and
updating the current velocity model using a low-wavenumber component of the velocity model update,
wherein the current velocity model as last updated is used to obtain an image of the surveyed subsurface formation usable to locate natural resources.

20. The method of claim 19, wherein the residual dataset is generated using a travel-time based cost function.

* * * * *